(12) United States Patent
Ueno et al.

(10) Patent No.: US 6,944,575 B2
(45) Date of Patent: Sep. 13, 2005

(54) SLAVE UNIT, NODE UNIT, CONTROLLERS AND NETWORK SYSTEM

(75) Inventors: Shintaro Ueno, Kyoto (JP); Hajime Izutani, Kyoto (JP); Toshiyuki Shigehisa, Kyoto (JP); Hiroshi Shimizu, Kyoto (JP); Naoya Ochi, Kyoto (JP)

(73) Assignee: OMRON Corporation, Kyoto-Fu (JP)

( * ) Notice: Subject to any disclaimer, the term of this patent is extended or adjusted under 35 U.S.C. 154(b) by 287 days.

(21) Appl. No.: 10/147,911

(22) Filed: May 20, 2002

(65) Prior Publication Data

US 2003/0004686 A1 Jan. 2, 2003

(30) Foreign Application Priority Data

| May 21, 2001 | (JP) | P2001-151538 |
| May 21, 2001 | (JP) | P2001-151584 |
| Nov. 6, 2001 | (JP) | P2001-340450 |
| Feb. 1, 2002 | (JP) | P2001-026174 |
| May 8, 2002 | (JP) | P2002-133121 |

(51) Int. Cl.[7] ............................ G06F 15/00; G05B 19/00
(52) U.S. Cl. ..................... 702/188; 702/117; 702/187; 700/3; 700/14
(58) Field of Search ................. 700/3, 9, 14, 286, 700/295; 702/182, 187, 188, 189, 117, 120, 122, 60–64; 318/473, 600

(56) References Cited

U.S. PATENT DOCUMENTS 4,495,568 A * 1/1985 Gilbert et al. ............... 714/22
4,635,195 A   1/1987 Jeppesen, III et al.
4,675,664 A * 6/1987 Cloutier et al. ............. 340/685
4,937,811 A * 6/1990 Harris ........................ 370/200
5,555,269 A   9/1996 Friday, Jr. et al.
6,294,889 B1 * 9/2001 Briant et al. ................ 318/473

FOREIGN PATENT DOCUMENTS

| CN | 1108376    | 9/1995 |
| GB | 2 341 258 A | 3/2000 |
| JP | 10-149215  | 6/1998 |

OTHER PUBLICATIONS

Patent Abstracts of Japan, vol. 1998, No. 11, Sep. 30, 1998 (Hitachi Ltd.; Bridgestone Corp.) Abstract only.

* cited by examiner

*Primary Examiner*—Bryan Bui
(74) *Attorney, Agent, or Firm*—Foley & Lardner LLP

(57) ABSTRACT

Providing a slave that can precisely measure operating time of an output device that is service information, without having effects on a control system. To Mix slave 13 connected to a field network 12, an actuator 14 and sensor 15 that detects completion of operation of the actuator are connected. Having a built-in timer, the Mix slave measures time from when OUT terminal to which the actuator is connected turns ON until IN terminal to which the sensor is connected turns ON, by using the timer. Time thus obtained will be operating time of the output device. Comparison of this operating time with a setting will determine whether or not the actuator normally operates.

16 Claims, 28 Drawing Sheets

[Fig. 1]
(PRIOR ART)
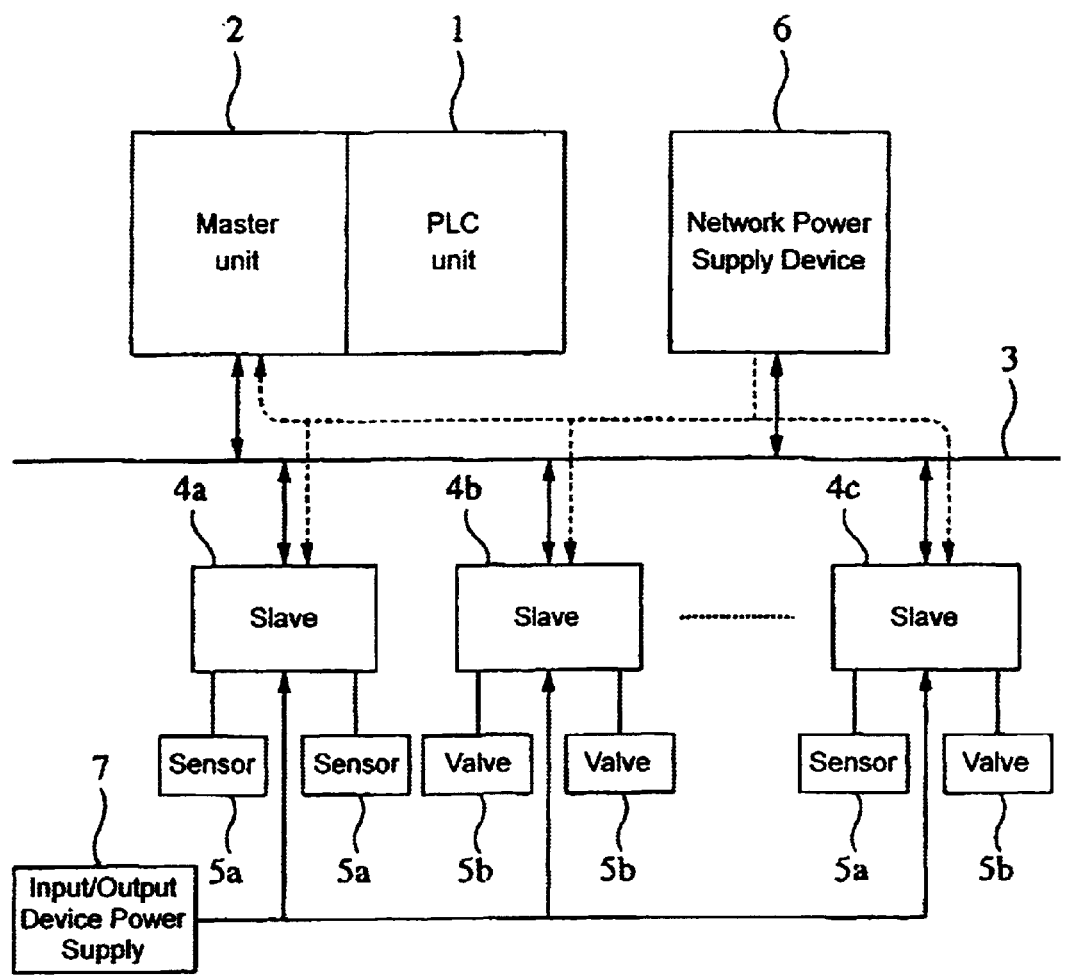

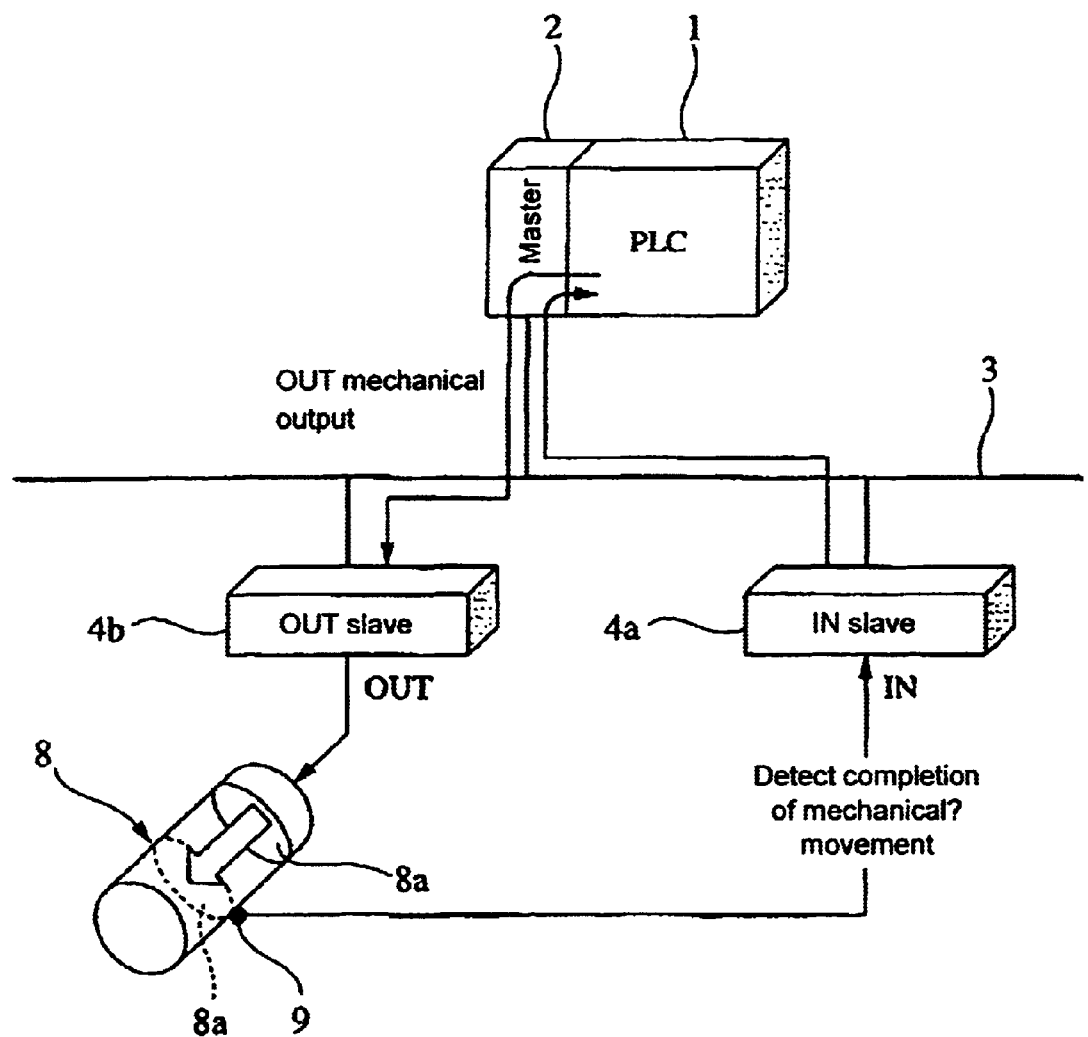
[Fig. 2]
(PRIOR ART)

[Fig. 3]
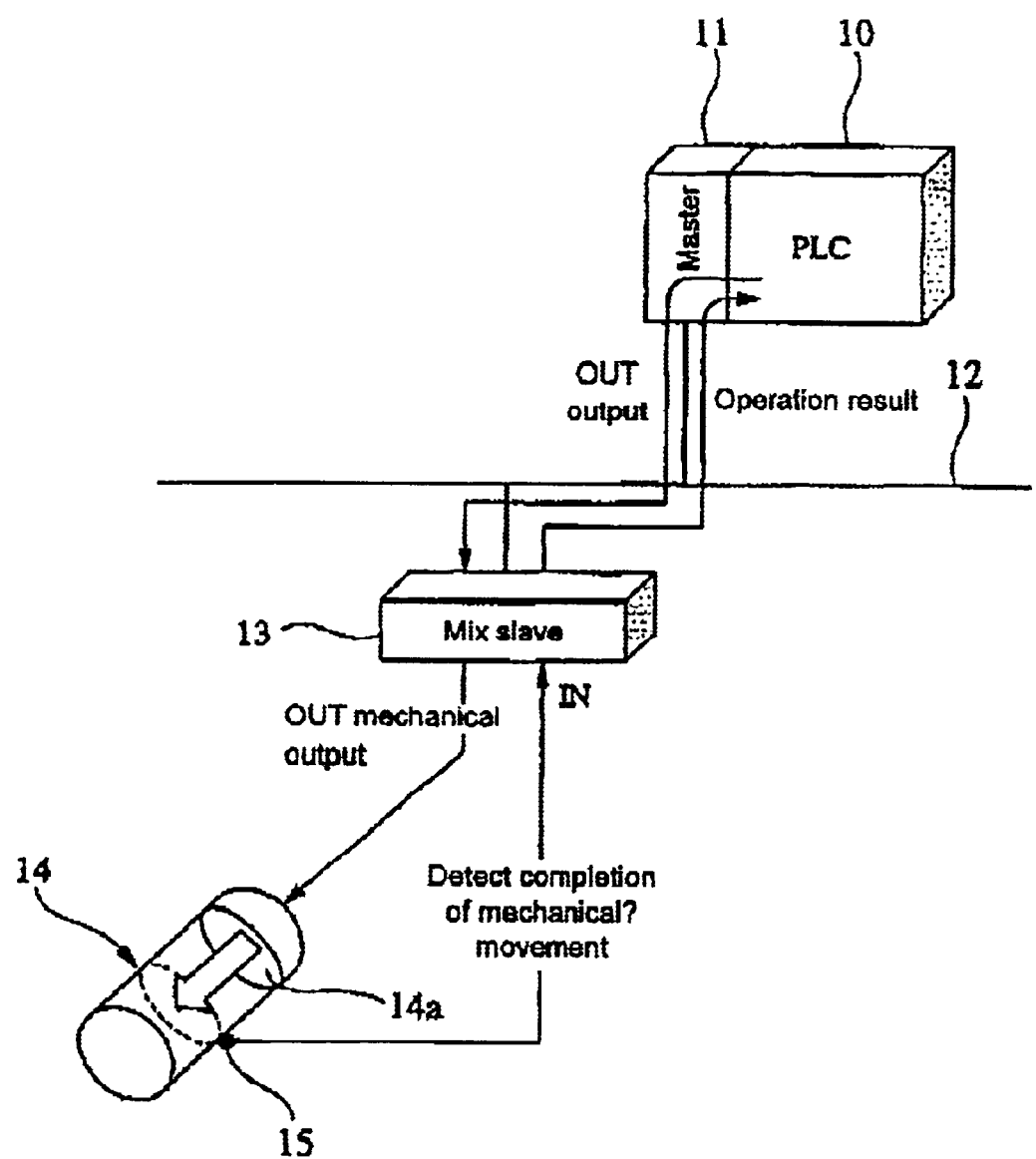

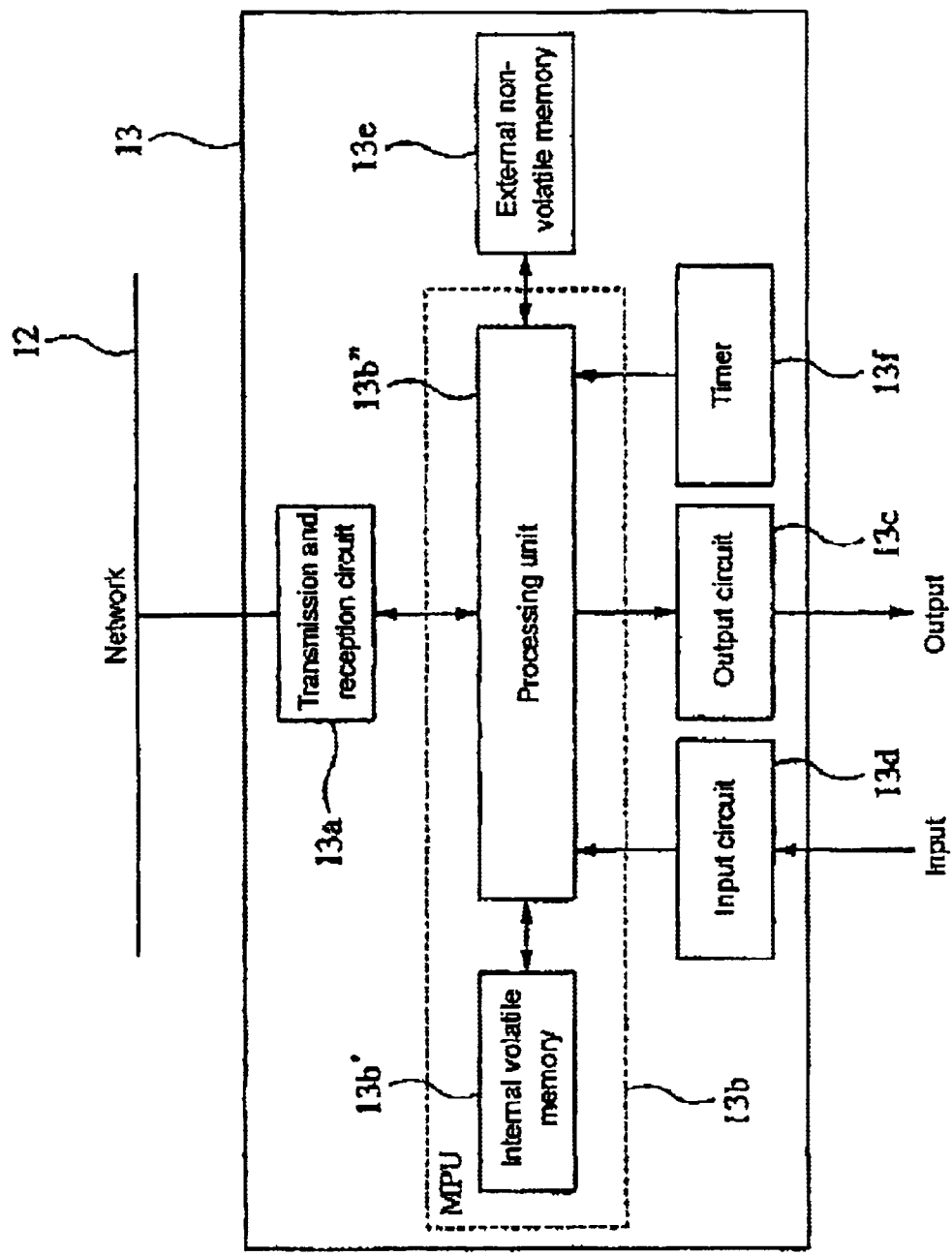
[Fig. 4]
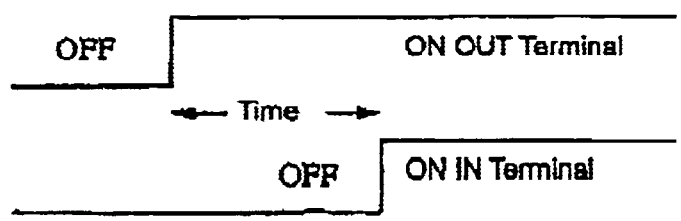
[Fig. 5]

[Fig. 6]
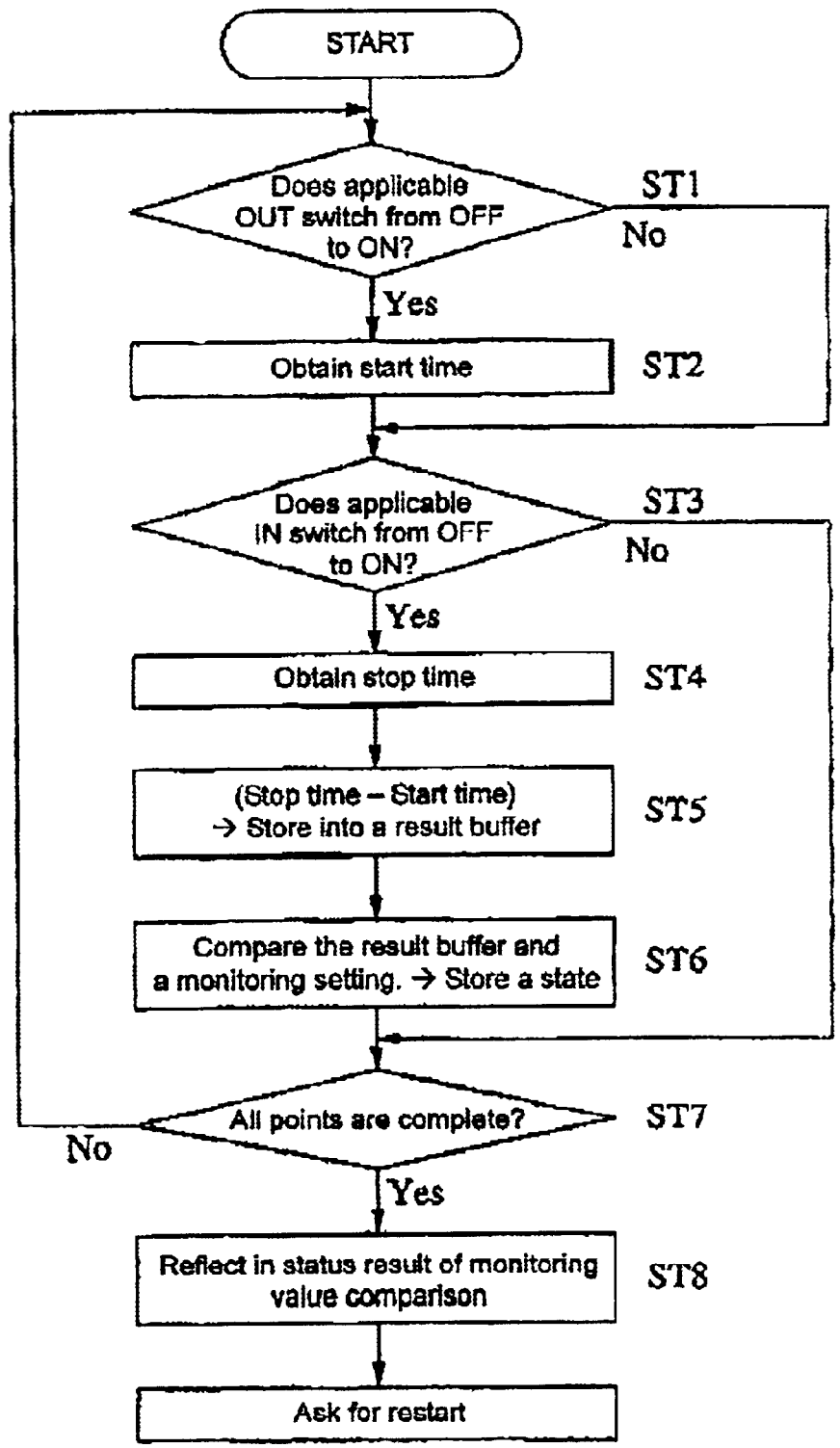

[Fig. 7]
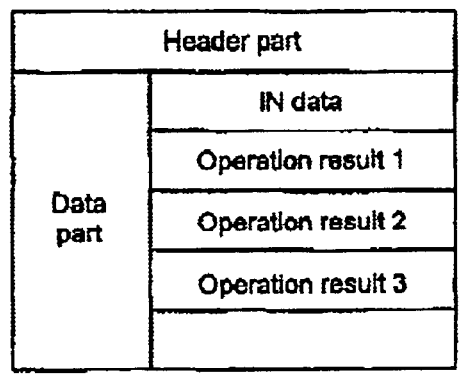
[Fig. 8]
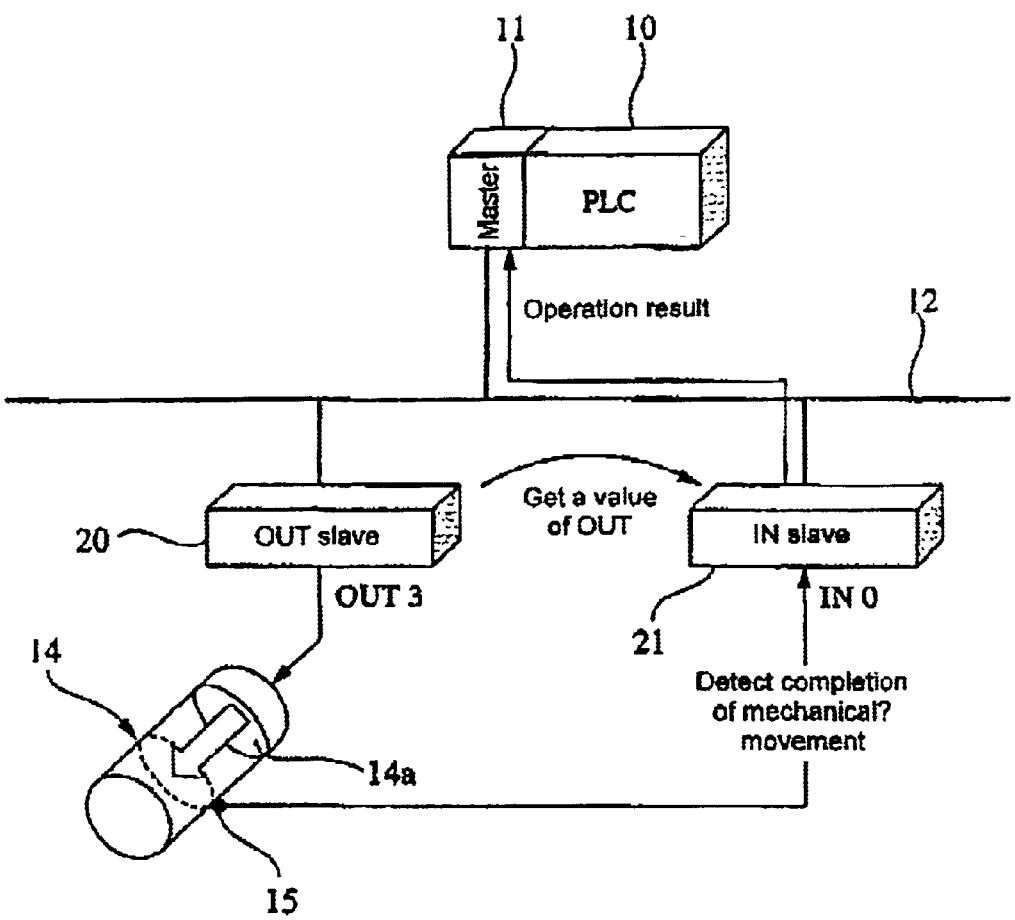

[Fig. 9]
MACID 0 (IN 16-point unit)
| Assignment No. | IN MACID—bit No | OUT MACID—bit No | Unit of OUT monitoring time |
|---|---|---|---|
| No. 1 | #00-0 bit | #01-1 bit | 10ms |
| No. 2 | #02-0 bit | #01-2 bit | 10ms |
| No. 3 | #04-0 bit | #01-3 bit | 10ms |
| No. 4 | #06-0 bit | #01-4 bit | 10ms |
| No. 5 | #23-0 bit | #01-5 bit | 10ms |
| No. 6 | #44-0 bit | #01-6 bit | 10ms |
| No. 7 | #21-0 bit | #01-7 bit | 10ms |
| No. 8 | #00-1 bit | #01-8 bit | 100ms |
| No. 9 | #00-2 bit | #03-2 bit | 100ms |
| No.10 | #00-3 bit | #11-0 bit | 100ms |
| No.11 | #00-4 bit | #13-4 bit | 500ms |
| No.12 | #00-5 bit | #13-5 bit | 500ms |
| No.13 | — | — | |
| No.14 | — | — | |
| No.15 | — | — | |
| No.16 | — | — | |
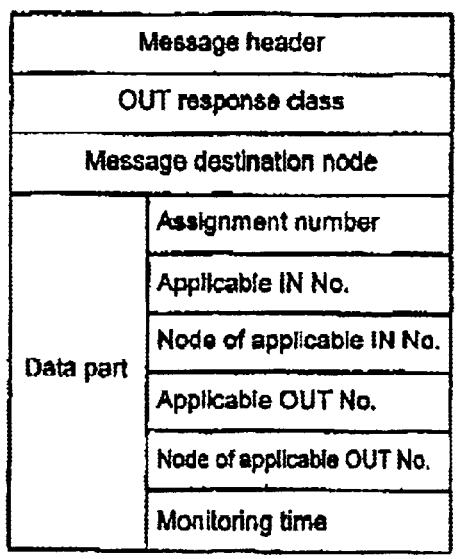
[Fig. 10]

[Fig. 11]
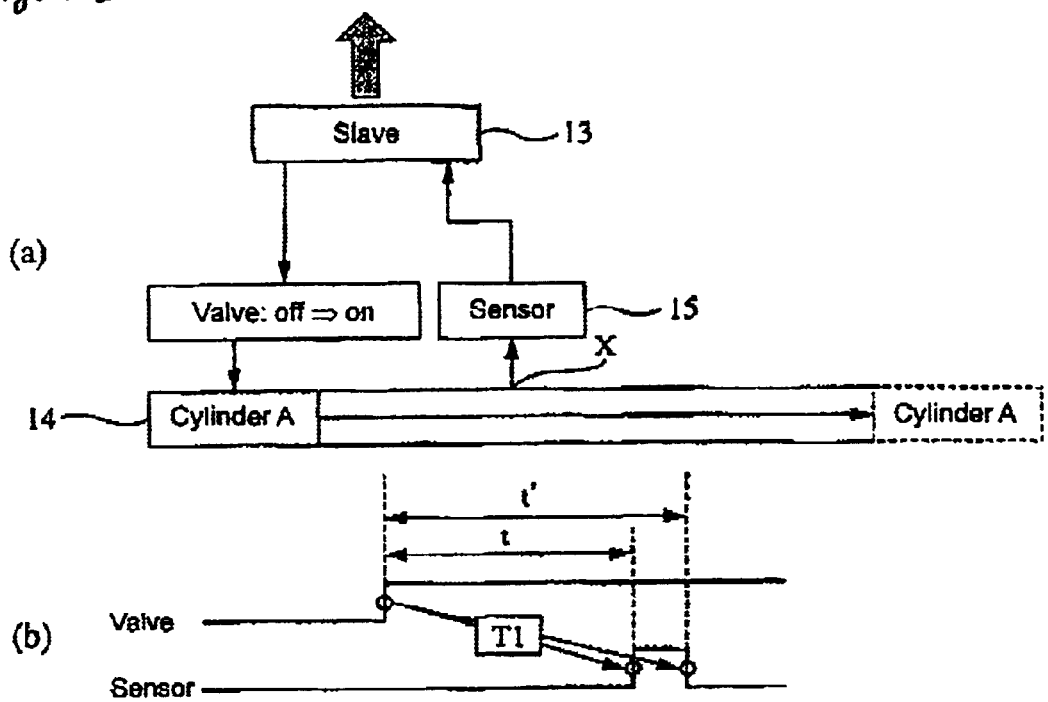
[Fig. 12]
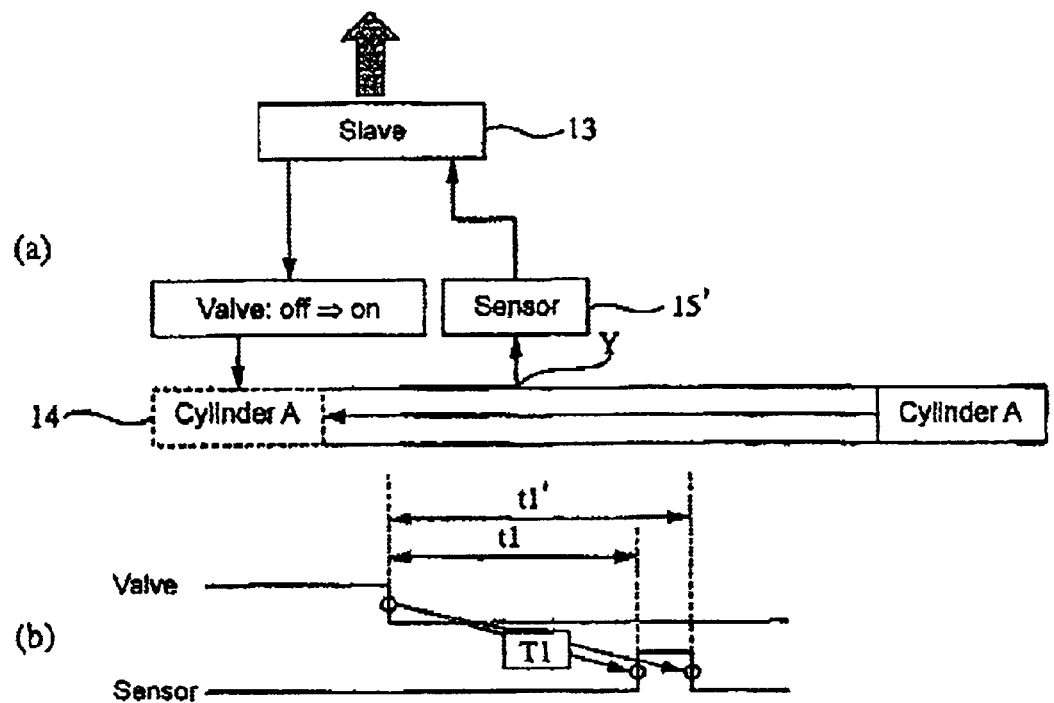

[Fig. 13]
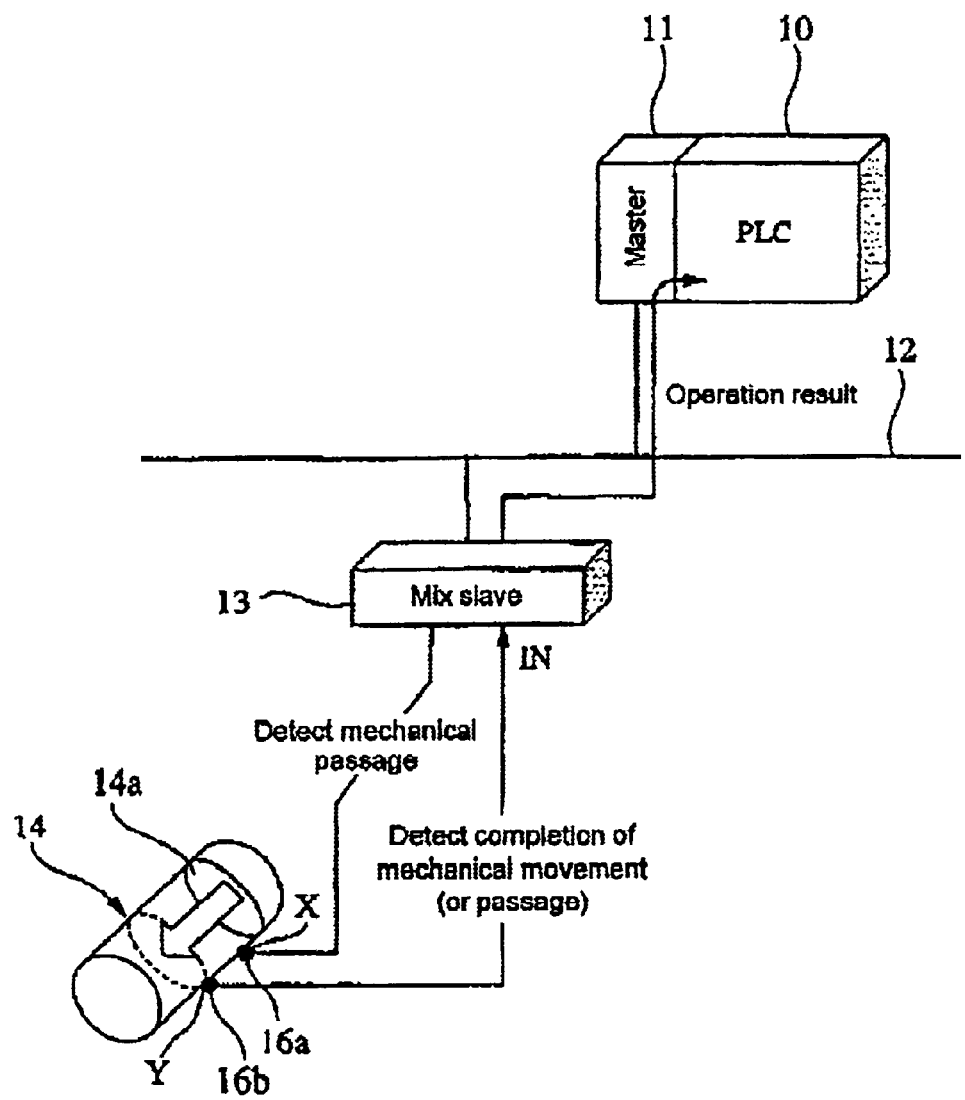

[Fig. 14]
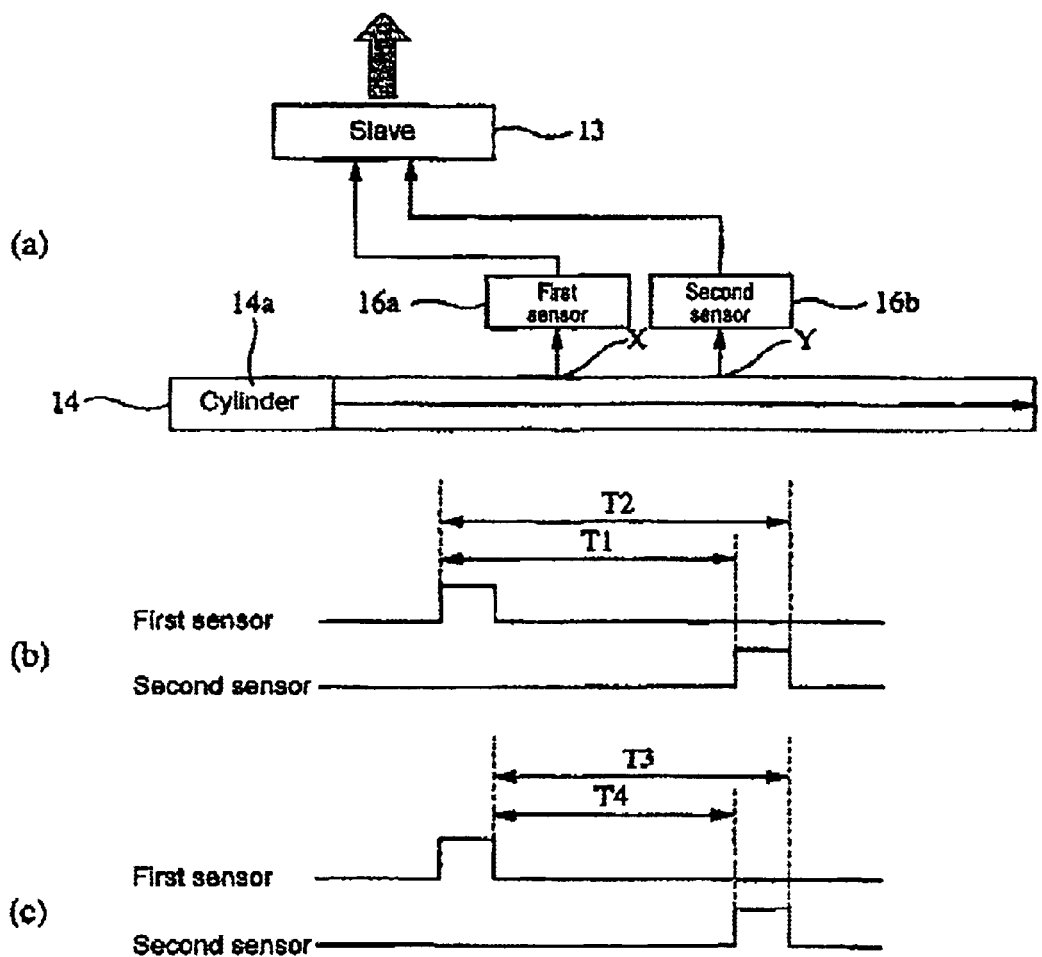

[Fig. 15]
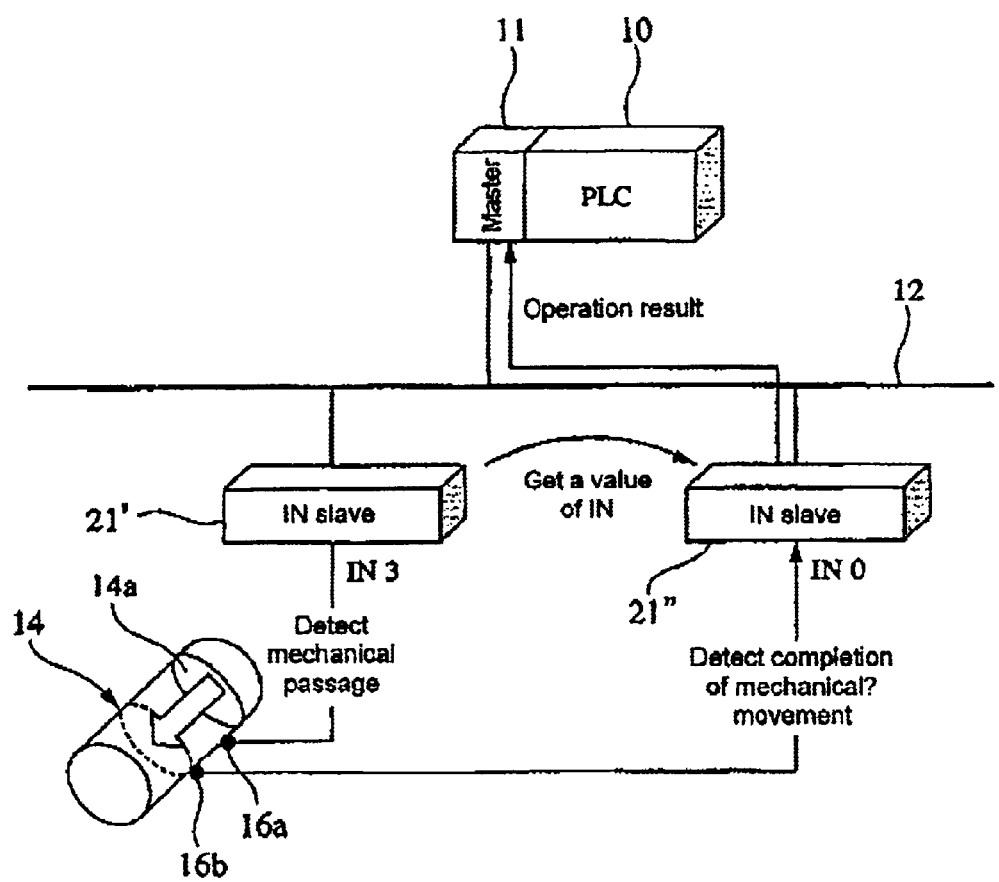

[Fig. 16]
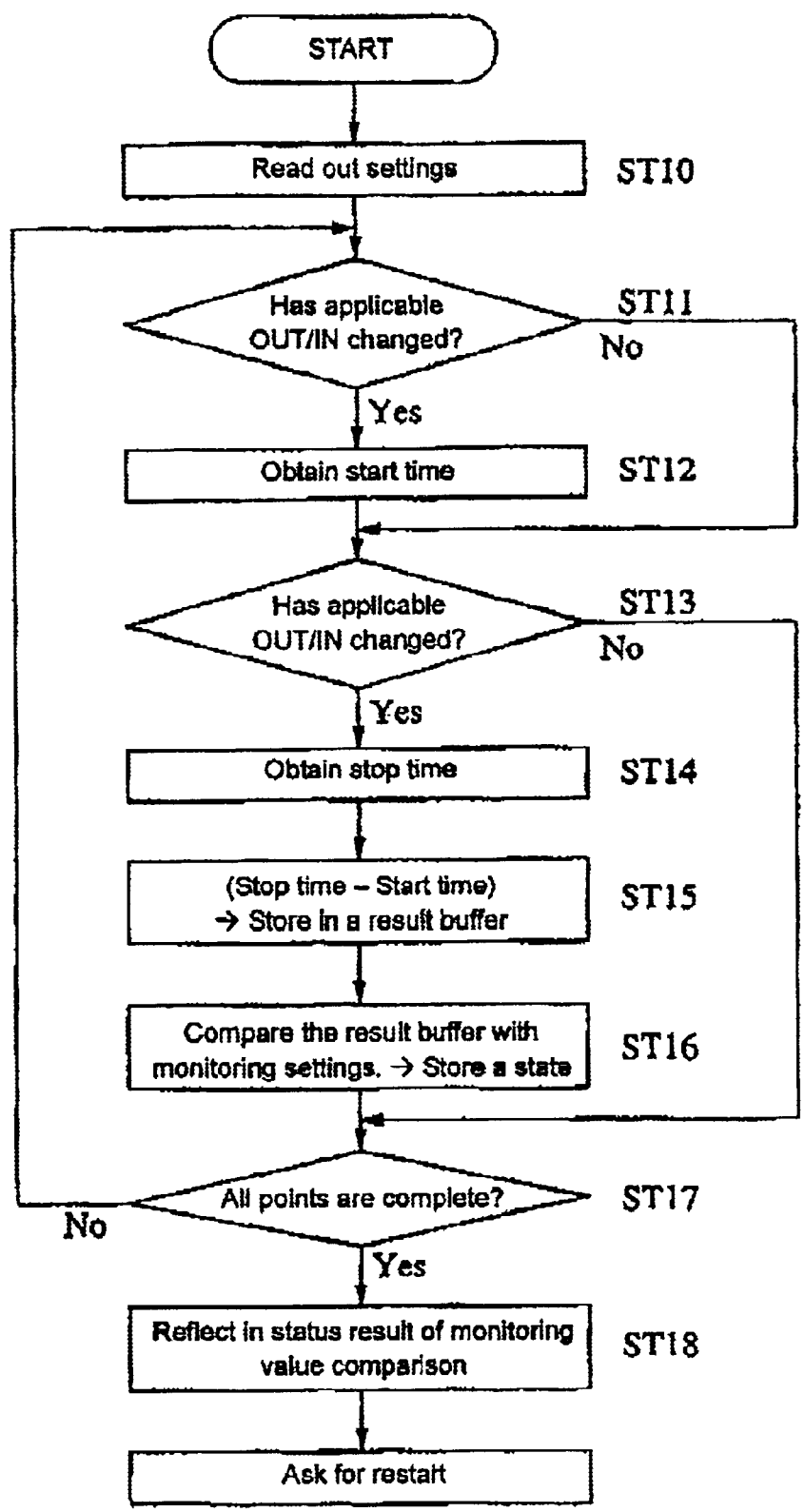

[Fig. 17]

MACID 0 (IN 16-point unit)

| Assignment No. | Start Trigger MACID – bit No | | Stop Trigger IN MACID – bit No | | Unit of Measuring Time |
|---|---|---|---|---|---|
| No. 1 | I | #00-0 bit ↑ | #01-1 bit | ↑ | 10ms |
| No. 2 | I | #02-0 bit ↓ | #01-2 bit | ↑ | 10ms |
| No. 3 | O | #04-0 bit ↑ | #01-3 bit | ↓ | 10ms |
| No. 4 | O | #06-0 bit ↑ | #01-4 bit | ↓ | 10ms |
| No. 5 | I | #23-0 bit ↑ | #01-5 bit | ↑ | 10ms |
| No. 6 | I | #44-0 bit ↓ | #01-6 bit | ↑ | 10ms |
| No. 7 | O | #21-0 bit ↑ | #01-7 bit | ↑ | 10ms |
| No. 8 | I | #00-1 bit ↑ | #01-8 bit | ↓ | 100ms |
| No. 9 | I | #00-2 bit ↓ | #03-2 bit | ↓ | 100ms |
| No.10 | O | #00-3 bit ↓ | #11-0 bit | ↓ | 100ms |
| No.11 | I | #00-4 bit ↓ | #13-4 bit | ↓ | 500ms |
| No.12 | I | #00-5 bit ↓ | #13-5 bit | ↓ | 500ms |
| No.13 | I | #00-2 bit ↑ | #00-4 bit | ↑ | — |
| No.14 | O | #00-3 bit ↑ | #00-4 bit | ↓ | — |
| No.15 | | — | — | | |
| No.16 | | — | — | | |

↑ : Rising     ↓ : Falling
I : IN Terminal   O : OUT Terminal

[Fig. 18]

| Message header | |
|---|---|
| Response class | |
| Message destination node | |
| Data part | Assignment No. |
| | Applicable Start Trigger No. |
| | Node of Applicable Start Trigger No. |
| | Applicable Stop Trigger No. |
| | Node of Applicable Stop Trigger No. |
| | Monitoring time |

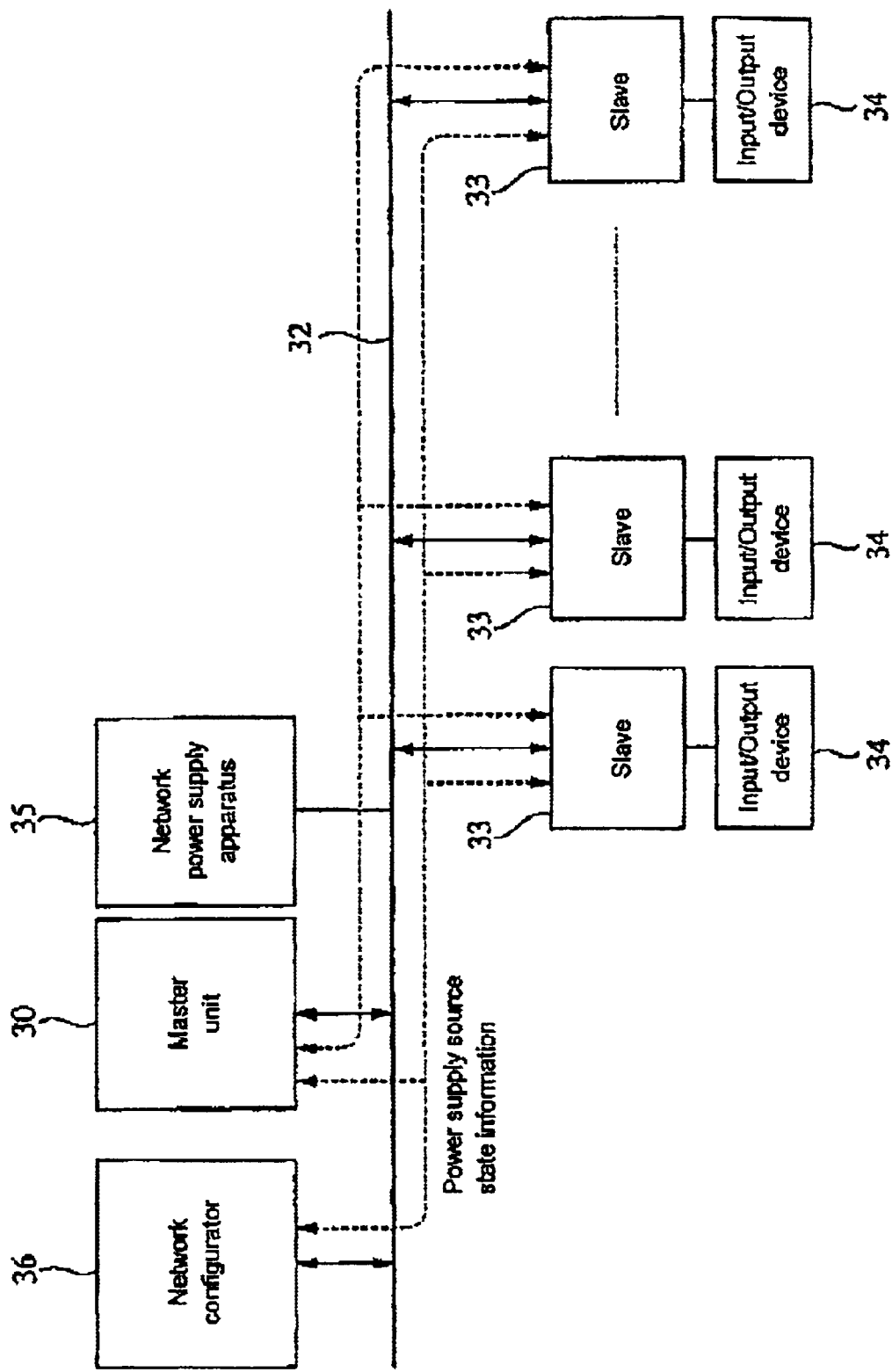
[Fig. 19]

[Fig. 20]
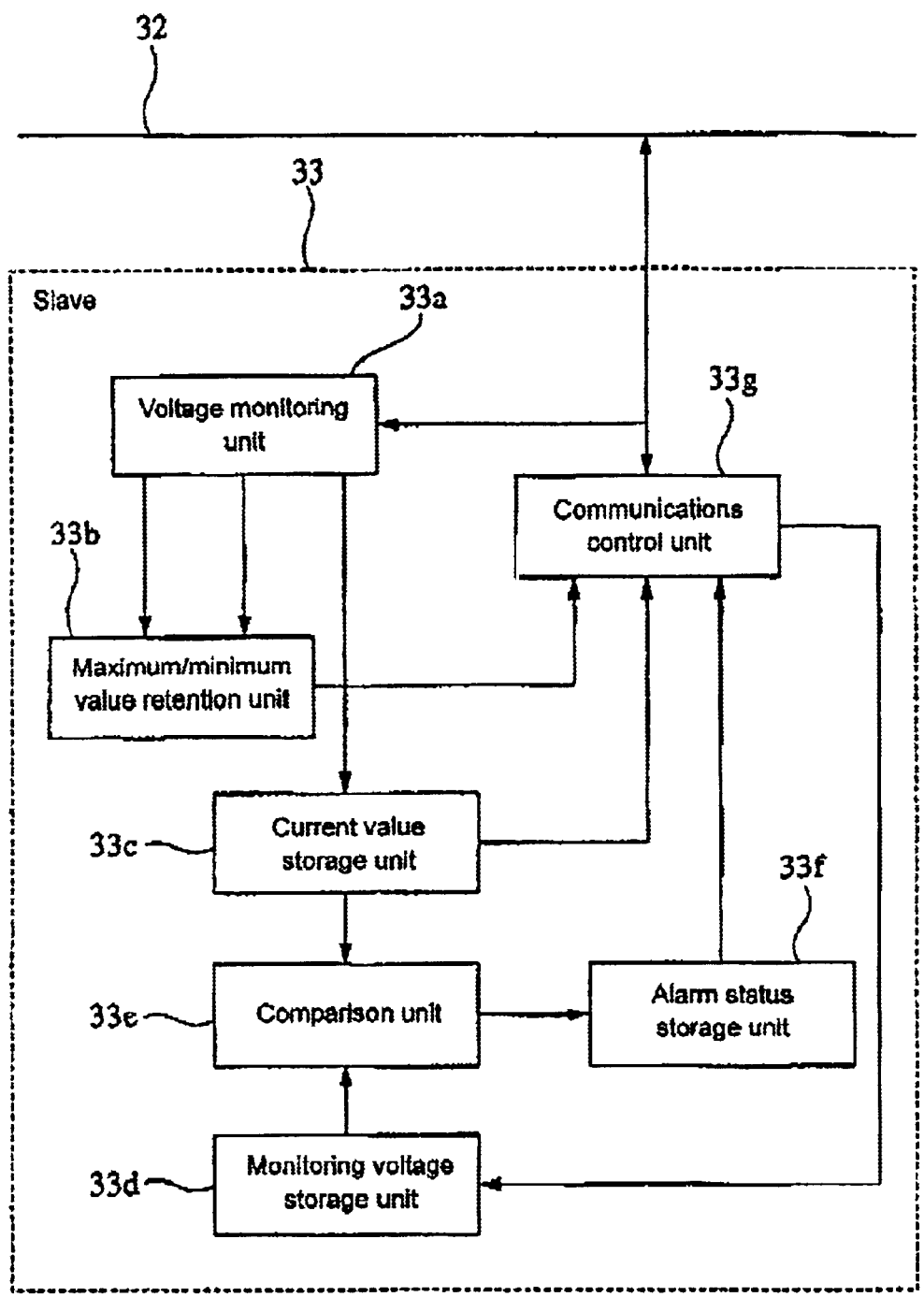

[Fig. 21]
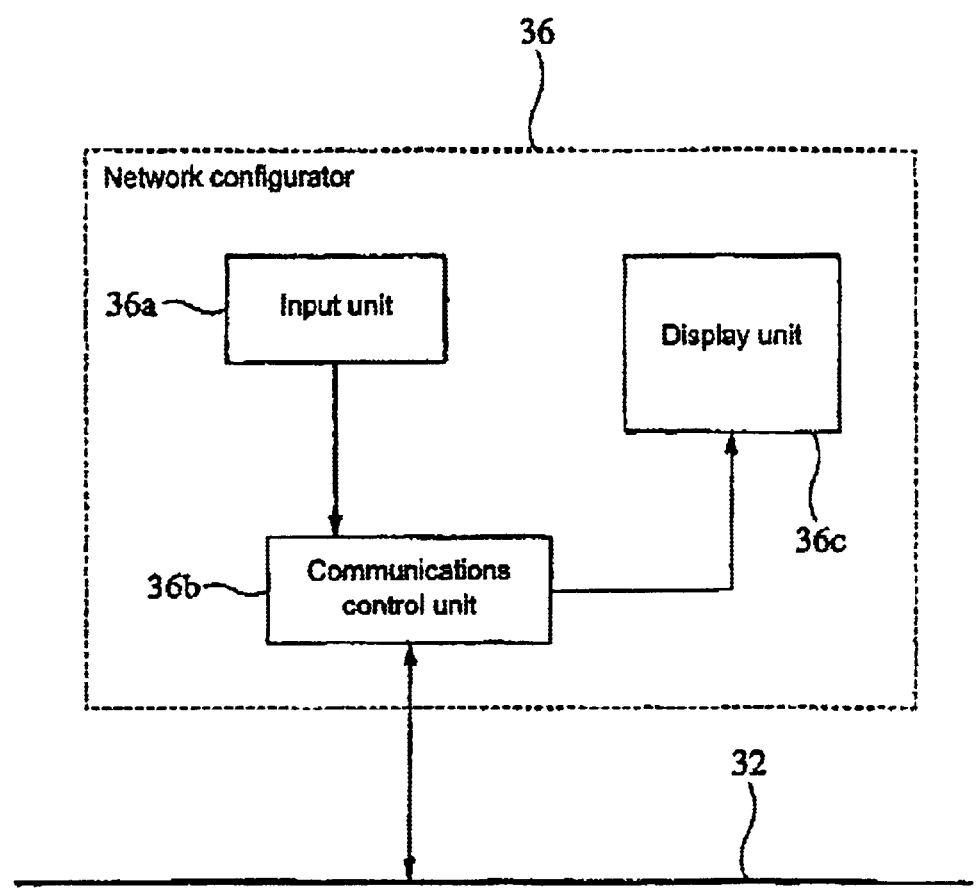

[Fig. 22]
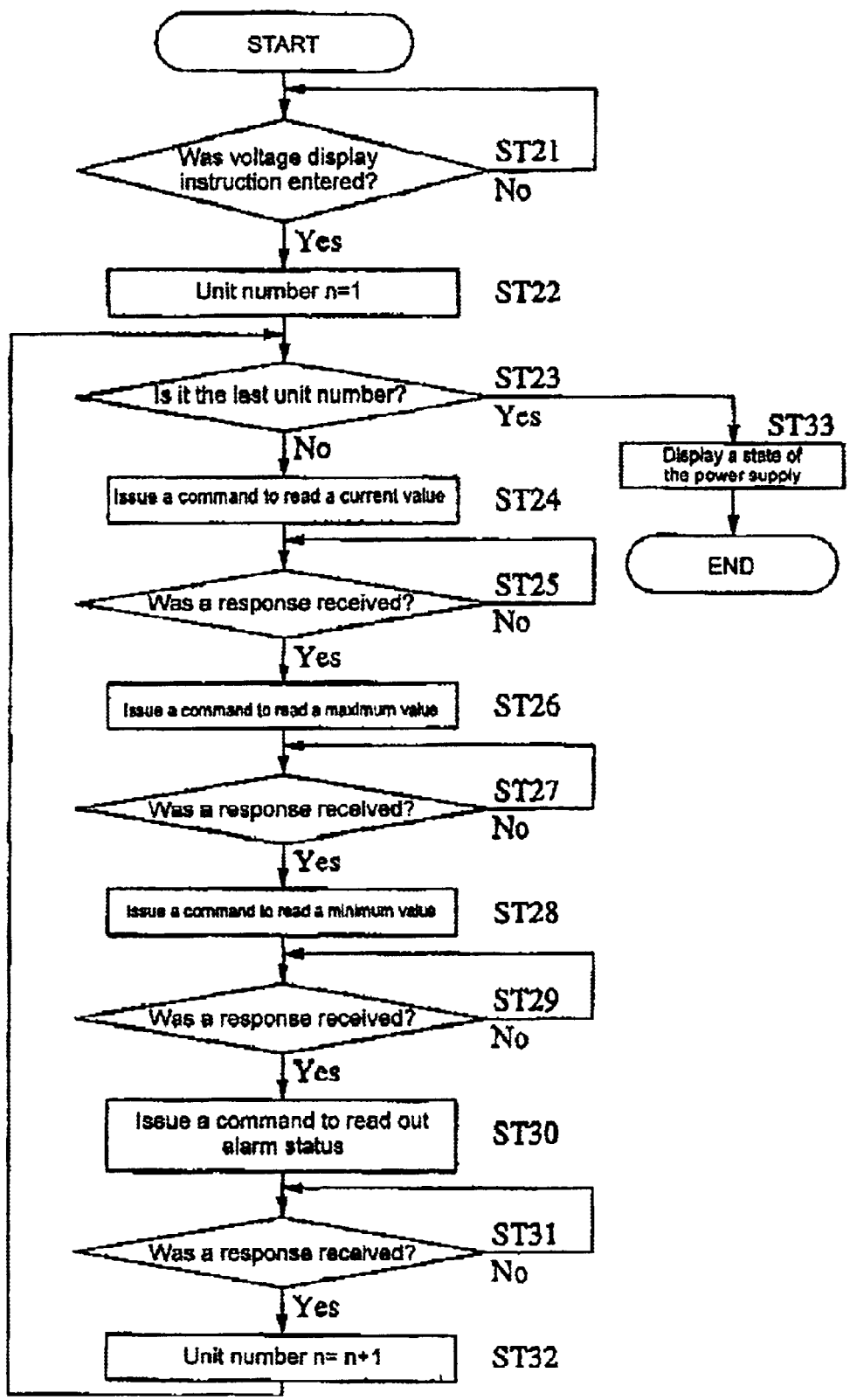

[Fig. 23]
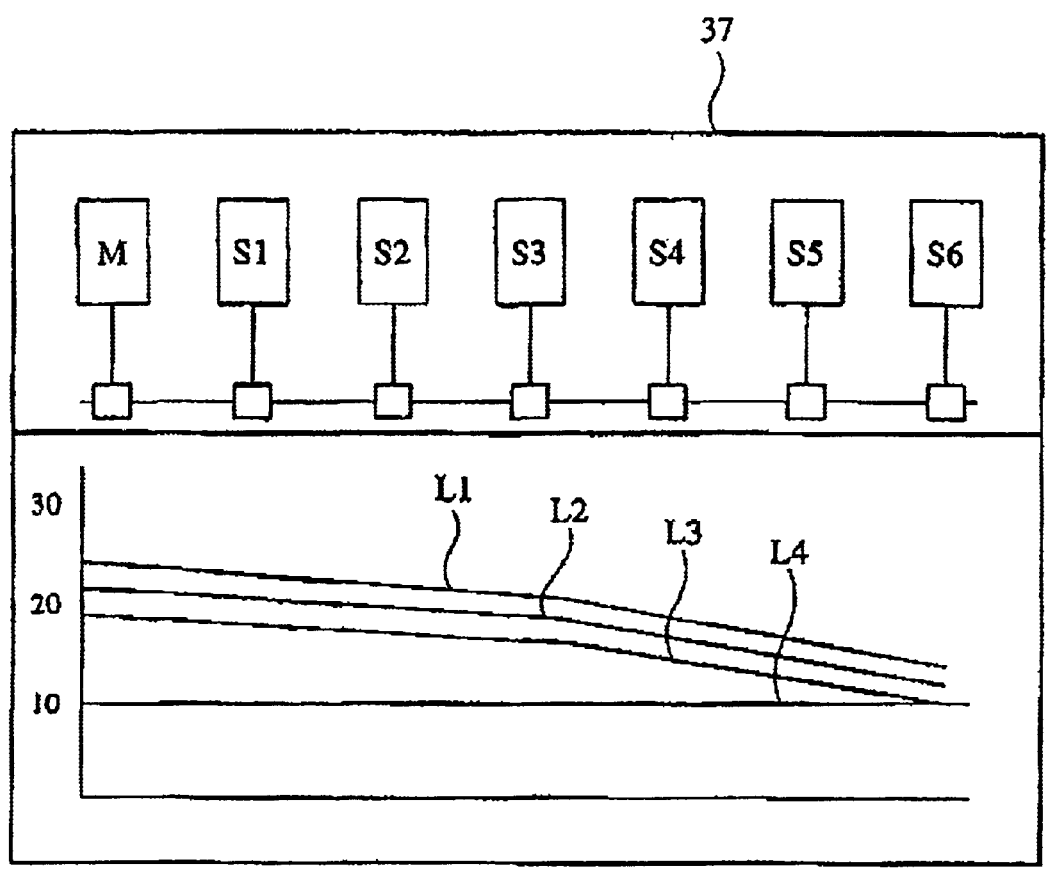

[Fig. 24]
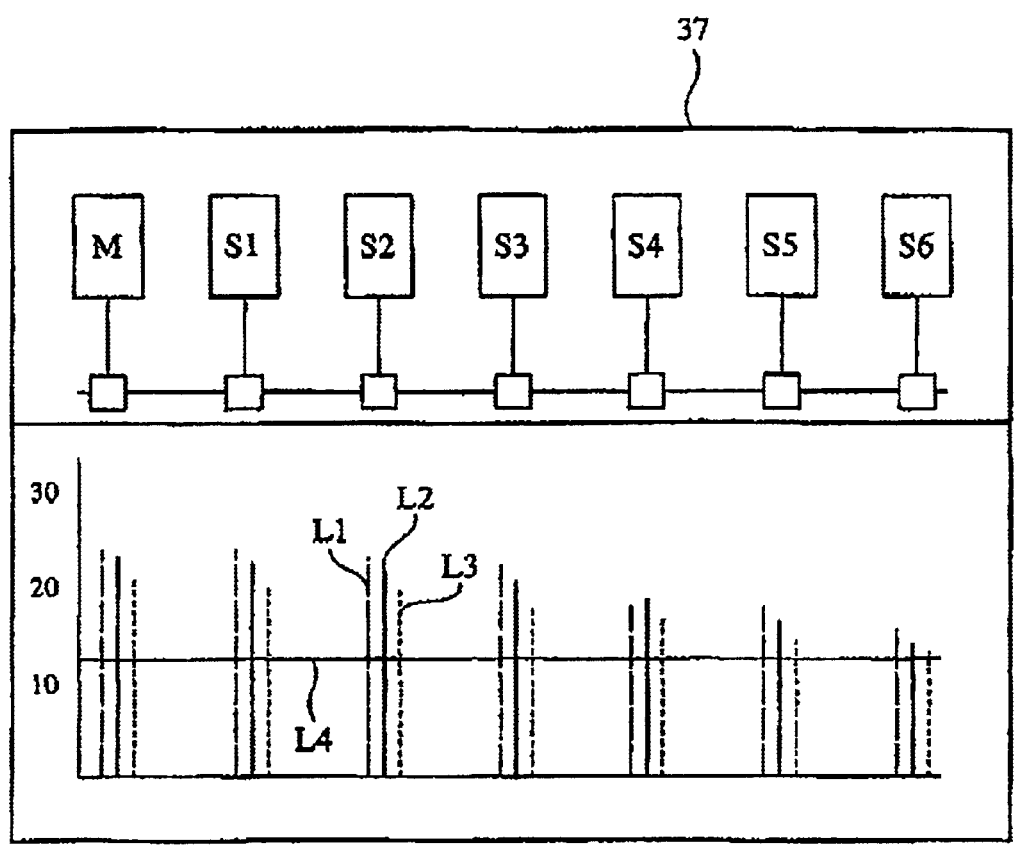

[Fig. 25]
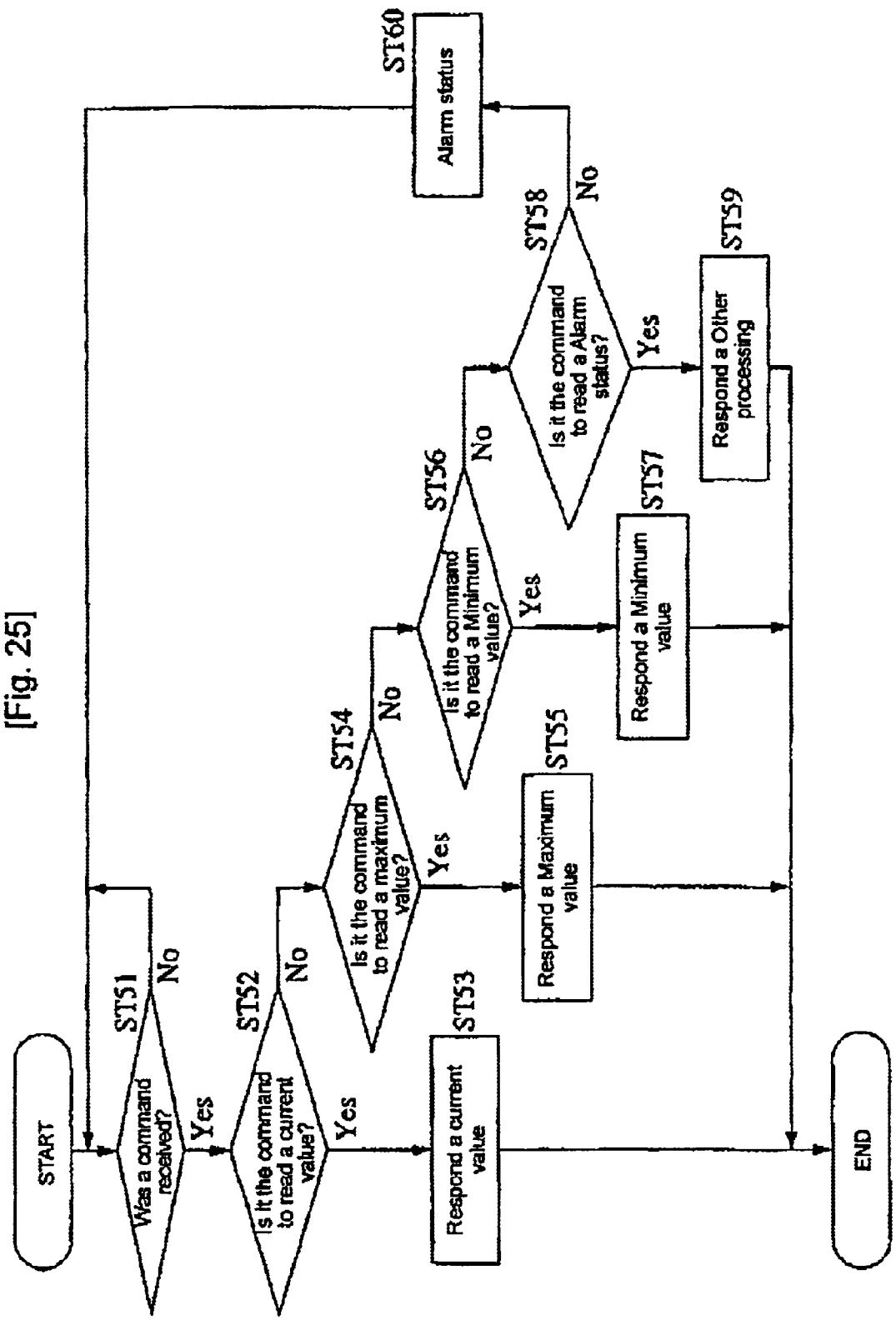

[Fig. 26]
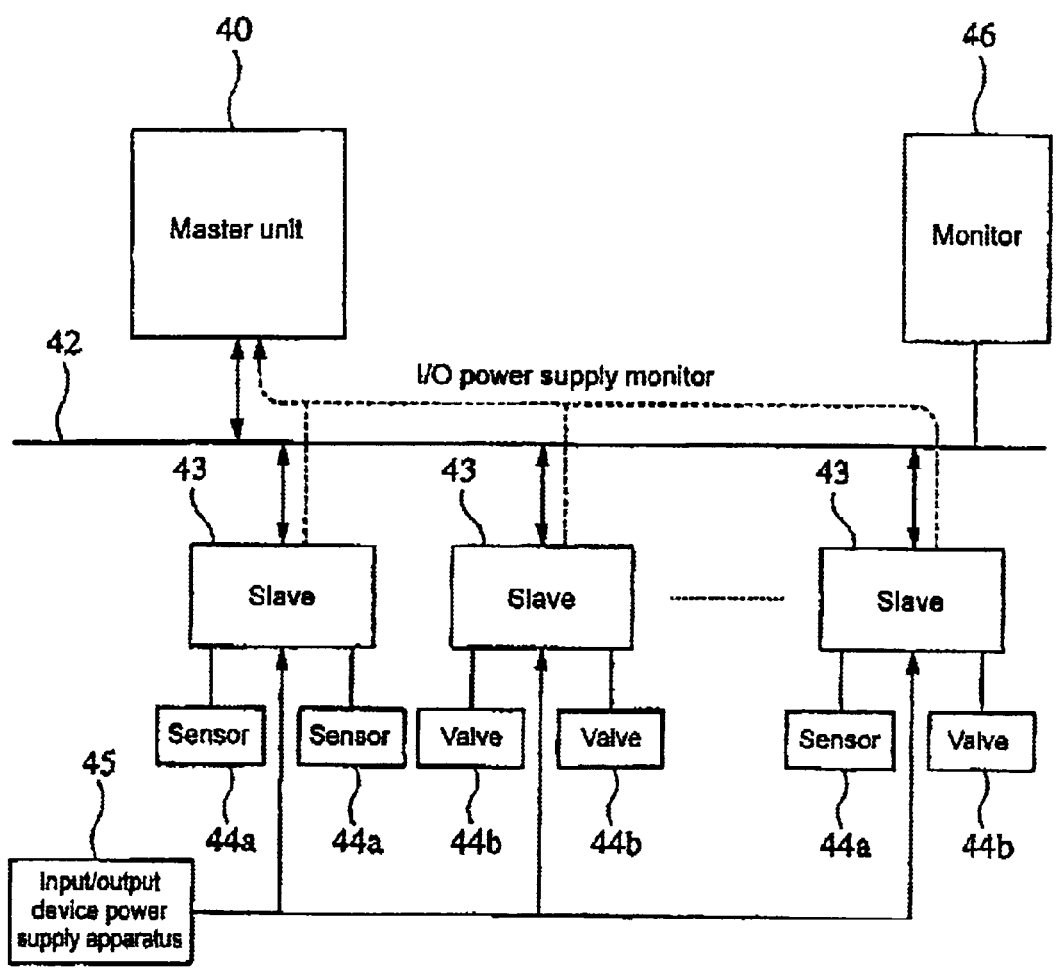

[Fig. 27]
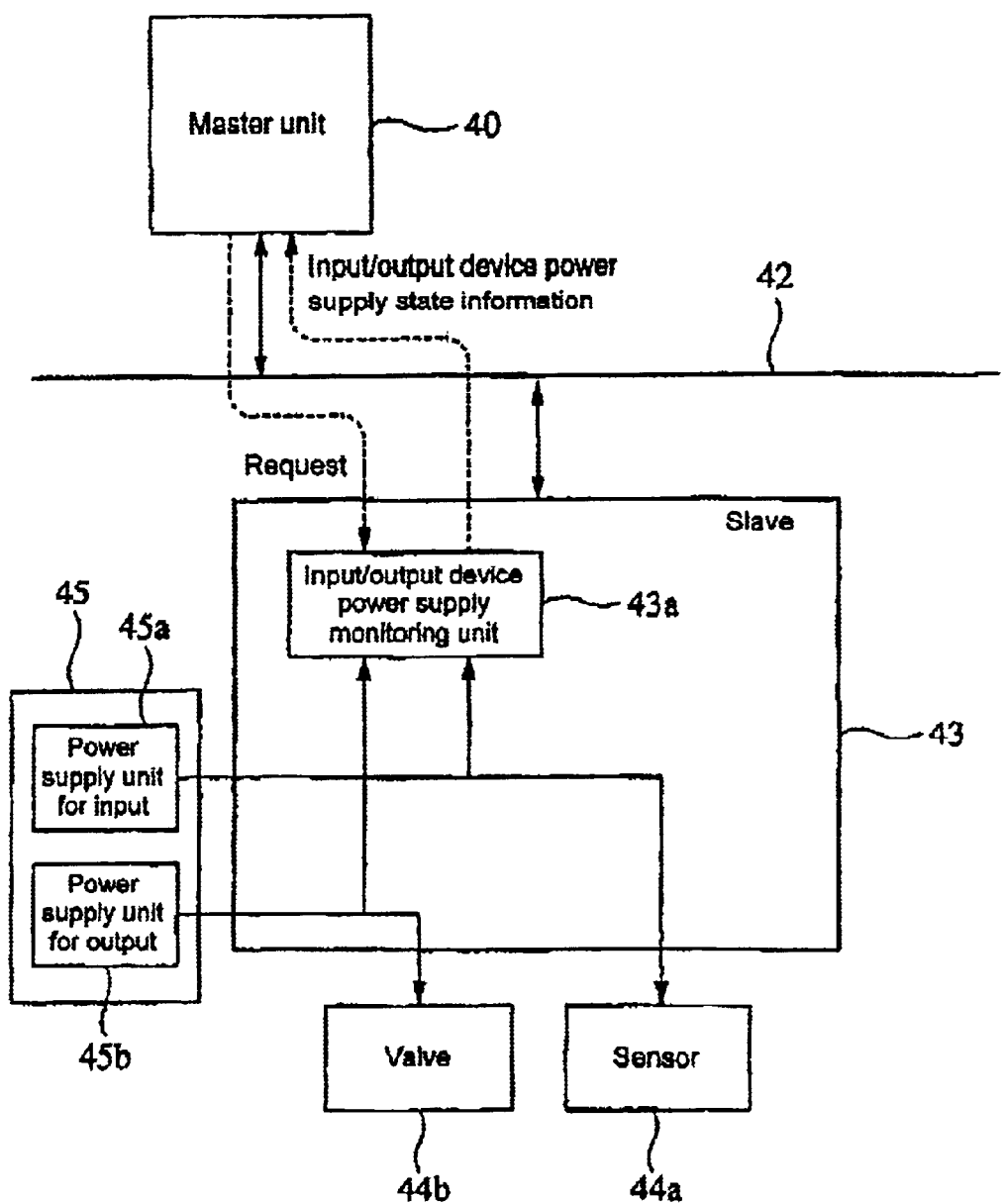

[Fig. 28]
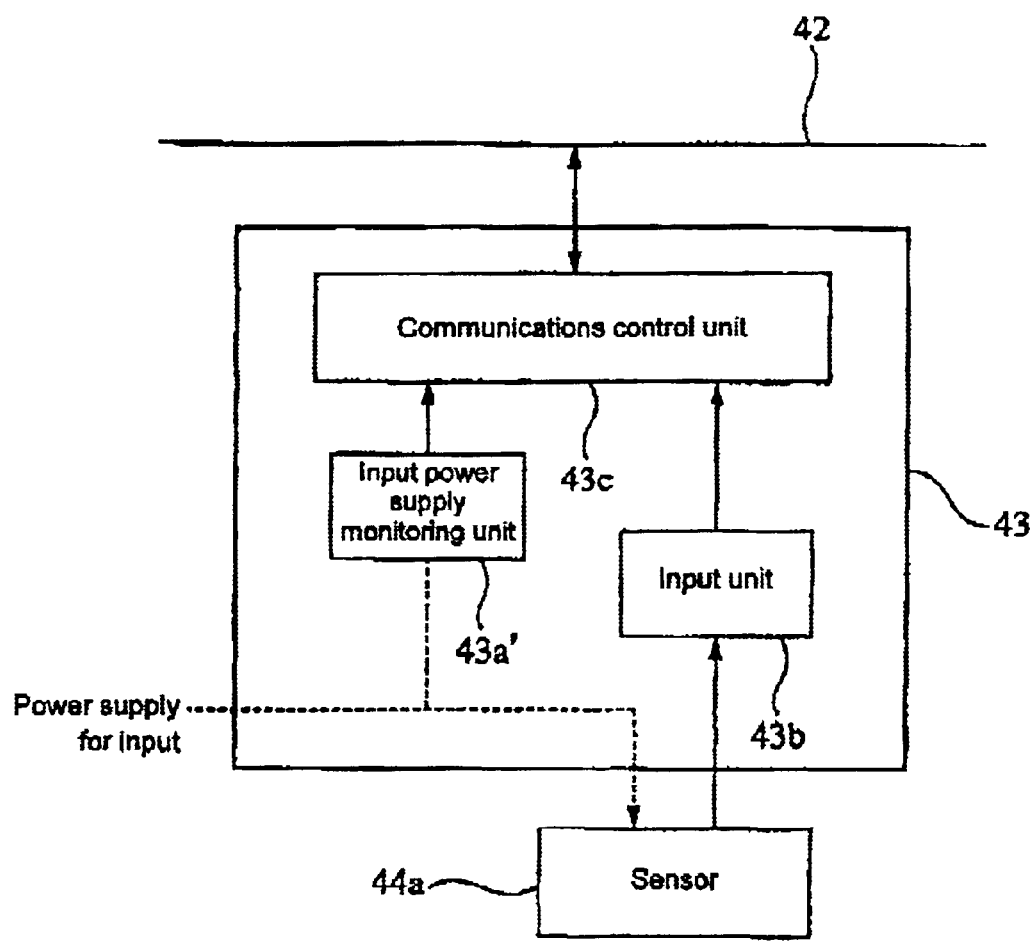

[Fig. 29]
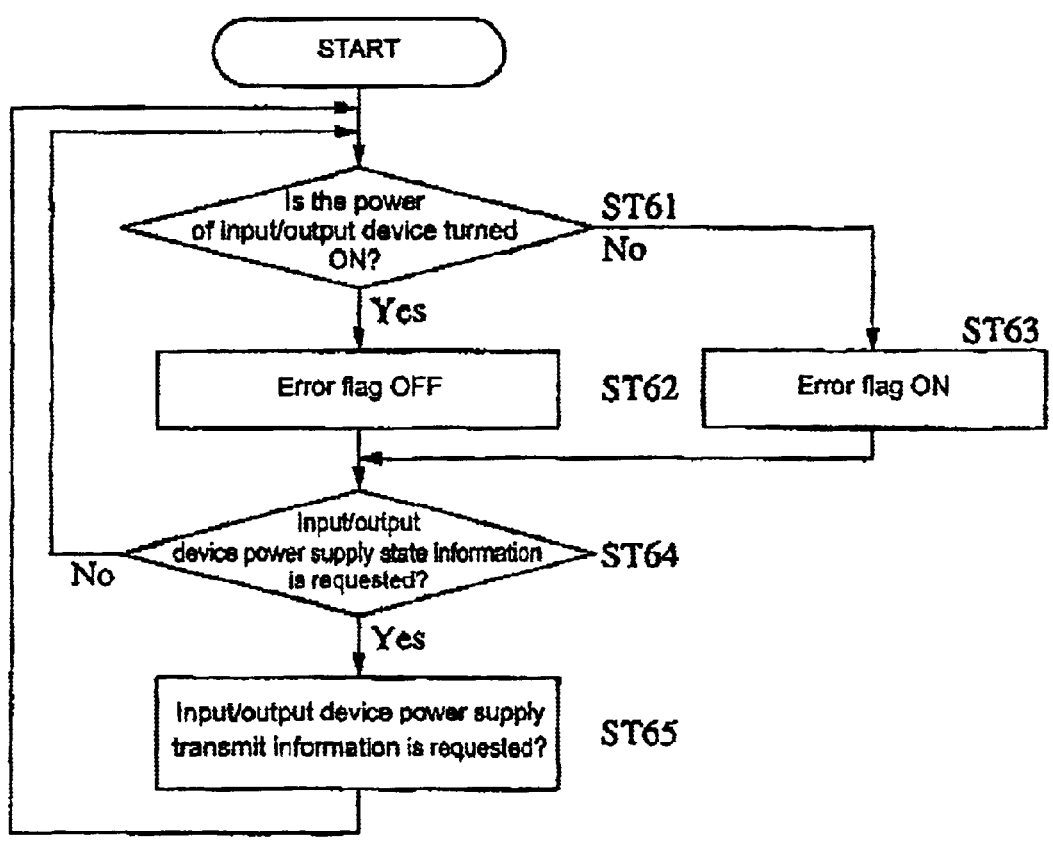

[Fig. 30]
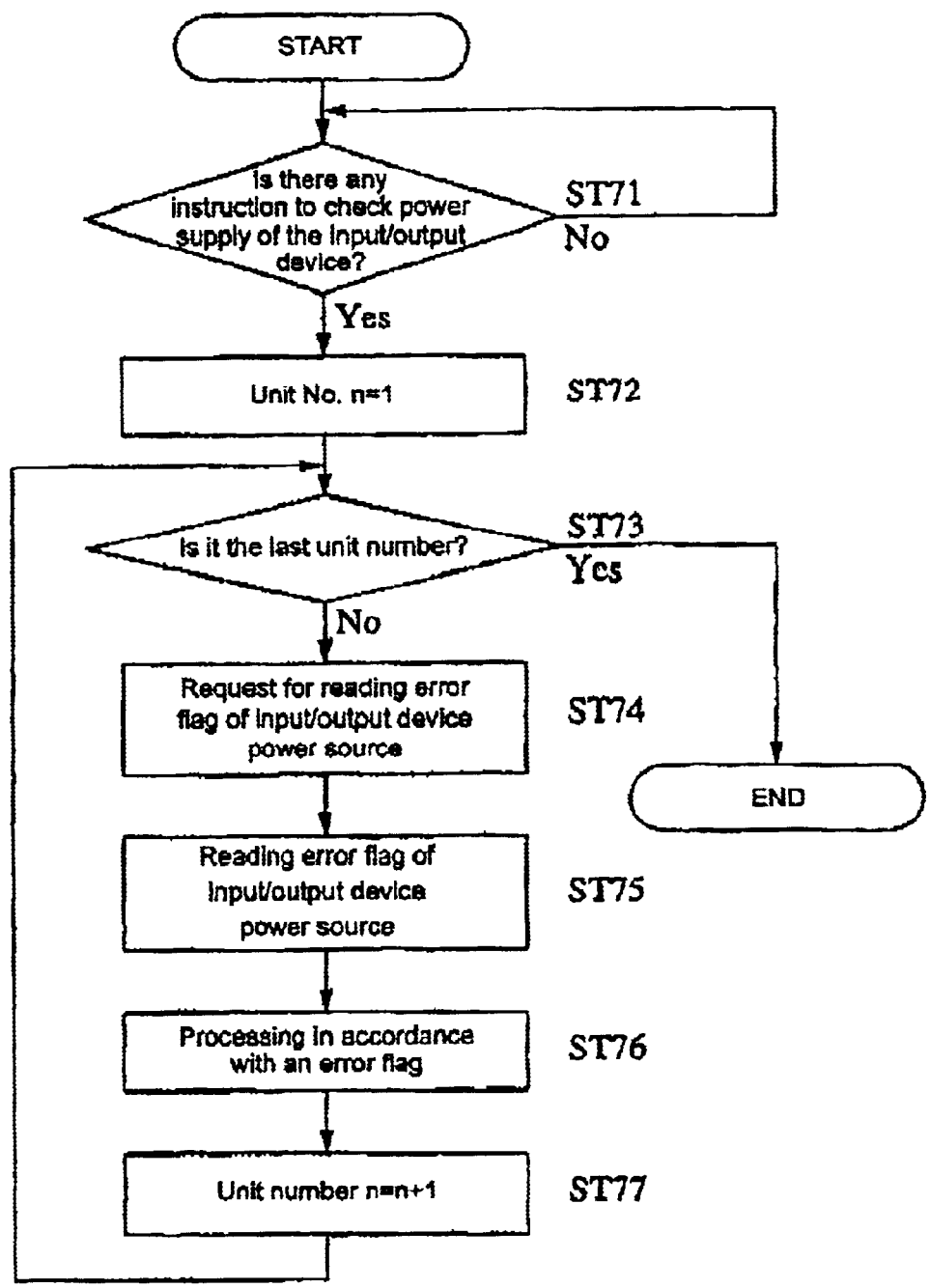

[Fig. 31]
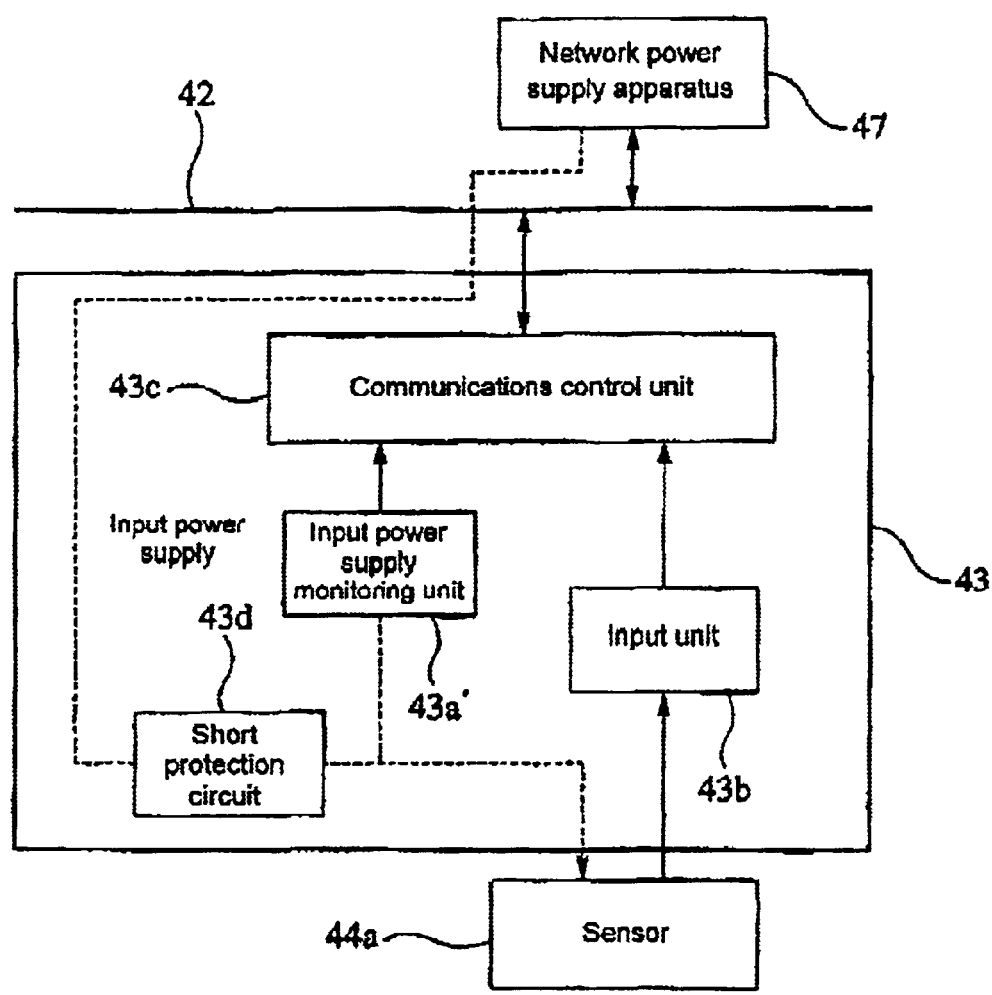

[Fig. 32]
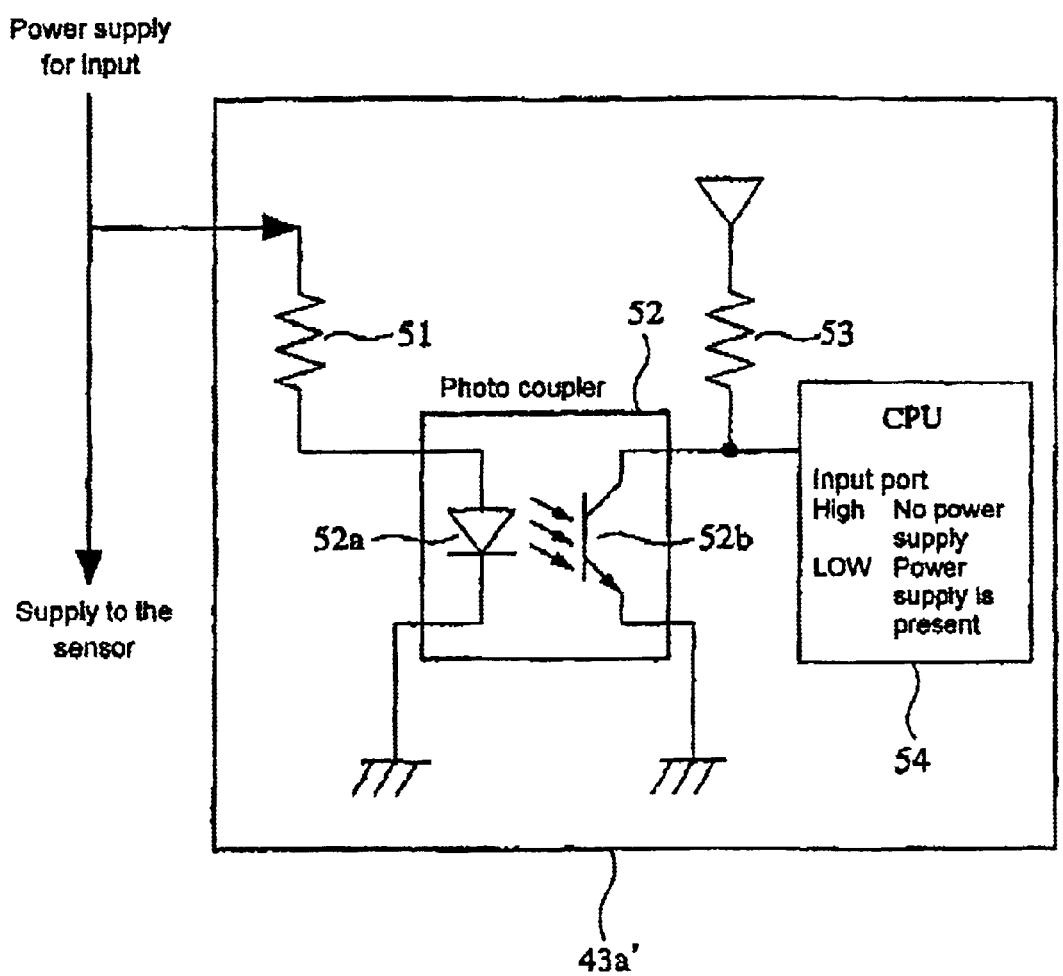

SLAVE UNIT, NODE UNIT, CONTROLLERS AND NETWORK SYSTEM

BACKGROUND OF THE INVENTION

1. Field of the Invention

The present invention relates to a slave and node, and a processing unit and a network power supply monitor system, and an input/output device power supply monitoring system.

2. Related Art

As well known, in factory automation (hereafter referred to as "FA"), an I/O device is connected to a programmable controller (hereafter referred to as "PLC") directly or via a network. A PLC is designed to control overall FA system by obtaining as Input data Information from such input devices as a switch or sensor that are a sort of the associated I/O devices, executing, in accordance with a pre-installed user program, an arithmetic operation with the associated input data obtained, to determine content of control to an output device that is a sort of the I/O device, and outputting control data corresponding to the control content, to such output devices as a valve or actuator, motor, etc.

More specifically, control in a CPU unit of PLC incorporates into an I/O memory of CPU unit a signal entered from an input device connected to an input unit (IN refresh), performs a logical operation (execution of an operation) based on a user program organized in a pre-registered ladder language, writes into the I/O memory execution result of that operation and sending it out to an output unit (OUT refresh), thereby the output unit performing a control of driving or stopping the output device, and subsequently executes so-called peripheral operations, such as processing of communications through a communication network. Thus, PLC processes IN refresh, execution of an operation, OUT refresh, and peripheral processing cyclically and repeatedly.

Such a PLC is comprised of a plurality of units. In other words, it is comprised of various units such an a power supply unit of a power supply source, a CPU unit that supervises control of the entire PLC, an input unit that inputs a signal of a switch or sensor attached to a suitable place of the production apparatus or equipment of FA, an output unit that outputs control output to an actuator, etc., an input/output device that combines input with output, a communications unit to connect with a communication network, etc.

In addition, a network system called a remote I/O is known. In this system, a master is connected to PLC unit to which a slave is connected via DeviceNet (registered trademark), etc.

Though this slave is IN slave that incorporates an input signal, OUT slave that outputs an output signal, Mix slave that inputs and outputs, etc., It shall be herein referred to as a slave. And, various devices of a sensor or relay are connected to terminals of the slave. In addition, as mentioned above, a master unit is one of the units that constitute PLC and is incorporated into PLC. With this, sensing information that has been detected by an input device (e.g., a switch or sensor, etc.) connected to the slave will be serially communicated to the master unit via a field network, and thus incorporated into PLC. And on the side of PLC, a user program is executed based on the obtained sensing information, result of its execution is conveyed to a slave via a network, which is to send a control instruction to output devices (e.g., a relay or valve, actuator, etc.) that should operate.

In addition, reception and transmission of I/O information such as an input or output signal of a device connected to the slave are performed with communication timing that has been set in advance between the slave and master unit, are asynchronous with cyclic operations of PLC, and thus operate with different timing. And the CPU unit and master unit of PLC are connected through a bus, and thus data is sent to and received from a master unit in IN refresh or OUT refresh (I/O refresh) or peripheral service processing, among cycling processing in the CPU unit. This enables the CPU unit of PLC to connect an input or output device located remotely to a slave, and send and receive data via a network.

Incidentally, in a recent network system, demands have been growing for supervising or monitoring, as appropriate, non-limiting Information such as so-called service information or system status information, maintenance information, etc., in addition to managing and monitoring current content of control. In a traditional network system, as Input data and output data including remote I/O exist in a memory of PLC, all service information used to be obtained by organizing a program on the PLC side. For example, it can be determined by measuring operation time of devices connected to the slave or time needed for I/O information to change to a different state. In order to do the associated operation, a user will create a user program to do the measurement, and execute and process the program in the CPU unit of PLC.

However, when an attempt is made to obtain service information on the PLC side, as mentioned above, two problems will arise. Firstly, load of execution and processing of a program of PLC will increase. This is because load to execute a program to get information of the service system will be generated. Secondly, communications load between a master and slave will increase. As this requires that the latest information be always obtained from the slave, a need to communicate basic data concerning service information will arise, in addition to control information as I/O data, in communications processing between the master and slave of PLC. Thus, volume of information to be communicated will expand, and cause to increase time to process communications, and a communications cycle between the master and slave will be long.

Hence, the objective of the present invention is to reduce effects on the control system on the PLC side if information of the service system is obtained, More specifically, It alms not only to reduce control load on the PLC side compared with the prior art, but also to improve convenience of a monitor, by securing non-limiting data such as service information by the slave, measuring physical quantities (time, voltage, number of times, etc.) at the slave, and making it possible to monitor that result via a network.

Next, while illustrating a more specific network system by means of figures, we will provide supplementary descriptions on additional objectives. As shown in FIG. 1. not only PLC unit 1 and master unit 2 equipped with communications capability are integrated, but also the master unit 2 is connected with a field network 3 for sending and receiving data of the control system. Also, to this field network 3, a plurality of slaves 4a, 4b and 4c are connected.

And, to each slave 4a, 4b and 4c are connected input device 5a such as a sensor, etc., and output device 5b such as a valve, motor, etc. In addition, in the shown example, slave 4a is also called IN slave as only input device 5a is connected to it, slave 4b is also called OUT slave as only output device 5b is connected to it, and slave 4c is also called Mix slave as input device 5a and output device 5b are connected to it. Note that in the following description, if no distinction needs to be made, in particular, they are simply referred to as a slave and also given a sign "4". In addition, if input device 5a does not need to be distinguished from output device 5b, they are simply called a device and also given a sign "5".

In the network system of the associated configuration, a network power supply apparatus 6 is placed from which power source Is supplied to a plurality of slaves 4 via a field network 3. And, power source may also be supplied, via slave 4, to devices 5 connected to each slave 4, using the power source supplied from the above-mentioned network power supply apparatus 6 to the slave 4.

In addition, a power supply source to various devices 5 is not limited to the above-mentioned network power supply apparatus 6, and, for instance, an Input/output device power supply apparatus 7 that is separately provided may be used. In other words, power supply output of the input/output device power supply apparatus 7 is given to each slave 4 through which power source is supplied to the devices 5. Note here that the input/output power supply apparatus 7 is a power source only for the devices 5 and thus power source is supplied to the slave 4 from the network power supply apparatus 6.

Incidentally, when supply of power source from the above-mentioned network power supply apparatus 6 to each slave 4 is considered, voltage will drop at the field network 3 because a resistance value of cables comprising the associated network is not zero though power source is supplied to each slave 4 through the field network 3. For this reason, voltage actually applied to the slave 4 drops from output voltage at the network power supply source 6. Therefore, voltage drop will increase to the slave 4 that is remote from the network power supply apparatus 6, and thus correct supply voltage that can satisfy provisions may not be obtained at a transmission/reception circuit chip in the slave 4 or MPU of the slave, etc.

Now, in order to normally operate this system, although a limit can be placed on the length of cables to be used in the field network 3, for instance, it is impossible to decide the cable length assuming a voltage drop which results from turning ON of devices 5 connected to the slave 4, etc. In addition, if the cable length is determined with a sufficient margin included, wiring may not be possible due to insufficient length of cables at a site where FA system is to be constructed.

Now, in order to normally operate this FA system, it is necessary not only to actually construct a system on a site, but also to ensure that source voltage to be supplied to each slave 4 is proper voltage that can satisfy the standard. However, it was the only way to ensure that this supply voltage is at a proper level is that a worker goes to a site and directly measures supply voltage of each slave by using a voltmeter, etc. Therefore, the associated work is not only very time-consuming but also complicated because a slave is sometimes installed on a back of the apparatus which is not easy to measure, etc.

In addition, there was no means of monitoring a voltage value of supply voltage at each slave. This sometimes led to inconvenience that abnormal conditions could only be detected when communications with the slave is disabled due to voltage drop in operation.

Furthermore, if a power supply source of the device 5 is the Input/output device power supply apparatus 7, a problem similar to those mentioned above will occur. In other words, there was the problem that PLC 1 or the master unit 2, which are a host, as well as a monitoring unit or configurator, to be discussed later, cannot know state of power supply of the input/output device power supply apparatus 7. The follow-ing problems also occurred in the master unit 2 and thus in PLC unit 1, which are a host.

If bit data corresponding to an input signal from the input device 5a connected to the said slave 4 that was received from the slave 4 via field network 3 was 0, a determination could not be made on whether the input signal was 0 because the said input device 5a actually turned OFF, or the input signal was 0 as a neutral operation because there was no supply voltage to the input device 5a, thereby disabling the device itself.

If bit data corresponding to an output signal to the output device 5b that was sent to the slave 4 via field network 4 was 0, a determination could not be made on whether the output device 5b has stopped because the output signal to the associated output device 5b actually turned OFF and thus 0 data was output, or the output device 5b itself is disabled because there was no supply voltage to the output device 5b. For this reason, there was a problem that reliability of the system was degraded.

In addition, to solve the problems described above, by judging whether or not there is a response from the slave 4 when a message is regularly sent to the slave 4 from the master unit 2 and PLC unit 1, for instance, it can be decided if the device receives normal voltage supply or not. To carry out associated operation, however, PLC should make judgment on transmission of a message and reception of a response, which will cause a problem that inherent control of the device 5 will be affected. Thus, the present invention is intended to reduce effects on the control system on the PLC side when supply voltage on the slave side of the remote I/O is obtained as service information.

On the other hand, FIG. 2 shows another specific system configuration. In other words, not only PLC unit 1 and master unit 2 with the communications capability are integrated, but also that master unit 2 is connected to the field network 3. OUT slave 4b or IN slave 4a is also connected to this field network 3. Associated basic network configuration is similar to that shown in FIG. 1.

And, in this example, the actuator 8 is connected to OUT slave 4b as output device 5b. In this actuator 8, upon receipt of a control instruction (ON signal) from PLC unit 1, OUT slave 4b turns ON the I/O terminal (OUT terminal) to which the actuator 8 is connected, whereupon the mobile unit 8a will move forward.

On the other hand, the sensor 9 is connected to IN slave 4a as input device 5a, and this sensor 9 monitors operation of the actuator 8. In other words, when the mobile unit 8a in the actuator 8 moves to a predetermined position (a position indicated by a dotted line in the figure), the sensor detects the mobile unit 8a, outputting a detection signal.

As that detection signal is provided to IN slave 4a, IN slave 4A outputs to PLC unit 1 a notice that it received the detection signal (i.e., predetermined I/O terminal (IN terminal) turned ON: operation complete notice). As PLC unit knows from this that the actuator 8 has moved for predetermined volume, it will send an instruction to stop (instruction to return to the origin) to OUT slave 4.

Now to actually perform the operation described above, each slave 4a and 4b performs master-to-slave communications with the master unit 2, and transmits and receives each signal (data) described above. Therefore, PLC unit I will communicate with each slave 4a and 4b via associated master unit 2.

In addition, PLC unit 1 cyclically performs operations according to a user program, wherein IN/OUT refresh operations are executed in every one cycle. Then, it sends a signal to OUT slave 4b or receives a signal from IN slave 4a. On the other hand, in the master-to-slave communications, asynchronous with cyclic operations on the PLC unit 1 side discussed above, carries out communications with predetermined slaves with a certain timing (communications cycle).

Incidentally, there is a demand for monitoring of operating time of the actuator 8, namely, period during which the mobile unit 8a Is moving. This is because a comparison between operating time and standard time, for example, can be used in determining if the actuator 8 is normally operating or not or in estimating service life due to deterioration in action of the actuator. However, traditionally, PLC unit side 1 should measure time based on ON/OFF information obtained from the slave 4a and 4b, and thus generate a program for monitoring, incorporate it into the user program, and execute it. In other words, the timer is started when PLC unit 1 outputs the instruction to operate (ON signal) to OUT slave 4b, and stopped when ON signal of IN terminal from IN slave 4a (operation complete notice) is received. With this, a value of the timer is obtained, and thus operating time will be known.

However, in the associated method, in order to obtain operating time information as service information, a need to execute the operation to measure operating time will arise, in addition to the inherent operation to control devices on the PLC side. Also, this applies to monitoring of the operating time of the input devices as well. In other words, if there are two input devices (sensors) that monitor a state of an apparatus, judgment can be made on whether the apparatus is normally operating or not, by monitoring time (operating time) from when one sensor detects the apparatus enters into one condition, till other sensor can detect the said apparatus is in another condition, etc.

However, execution of additional operations to determine the operating time described above while operations are cyclically processed on PLC unit 1 side for controlling the entire FA system will hamper high-speed control. Moreover, another problem will be caused wherein as the number of devices to be processed grows, additional operations on the PLC side will increase because more operations will be needed to calculate the operating time on the PLC side. In other words, as described above, the operating time will be determined by cyclically performing operations at PLC unit 1 every time, thereby leading to execution of wasteful operations.

SUMMARY OF THE INVENTION

Hence, it is an object of the present invention to obtain the operating time of devices as service information without affecting the control system on the PLC side. Specifically, it also an object thereof to be able to precisely measure, on the slave side, time based on operations, such as operating time, waiting time, etc. of output and input devices connected to the slave.

In order to achieve the first objective described above, a slave related to the present invention is a slave to which a control device is connected and that I/O communicates to the controller via remote lines. And, it is comprised of a measuring means of measuring physical volume of the said controller or said slave itself, and has the capability of outputting to lines Information based on measured values that have been measured with the said measuring means, if predetermined conditions are met.

The predetermined conditions herein mean may be those that are met at certain time intervals or at predetermined time, or various conditions of when a measured value exceeds the preset standard value, or when there is a request from the external, or when an operation is started up by inputting the power supply. Or, the information based on a measured value may be a measured value itself or a processed one such as result of a comparison of the measured value with the standard value, for instance. In addition, a line that outputs information based on the related measured value may be the said remote line or a different network line including wireless line. Note that the line is referred to as a network in the embodiment.

The measuring means is also capable of measuring based on various signals such as an Internal signal of the slave, signal to be input to the slave, signal to be output from a signal, etc. Also, a signal herein may be any of a digital signal such as ON/OFF, or an analog signal such as voltage. And if physical volume is a digital signal, detection of a point of signal change such as rising or falling of HIGH/LOW signals is one embodiment of measurement of physical volume.

In addition, one embodiment of the concept contained in a signal that is the basis of measurement of physical volume is one containing a signal to be input or output via a terminal of the slave. In other words, those are, for example, a signal of IN terminal to which the input device of the slave is connected, a signal of OUT terminal to which the output device of the slave is connected, a signal of the terminal of the slave to which the power supply is connected, a signal of the interface terminal of the slave to which the network in connected, etc. And, signals of each terminal are included, and they may not only measure physical volume directly from signal lines connected to that terminal or that terminal, but also measure a state of each terminal (ON/OFF) by detecting a value of I/O memory associated with that terminal, in the case of IN terminal or OUT terminal.

In addition, there are various kinds of physical volumes to be measured. In other words, they may be, for example, voltage of the network power source to be supplied via slave implemented in the fifth embodiment, supply voltage to be supplied to the said controller via slave implemented in the fifth embodiment, operating time to be timed by using as a trigger a change of I/O data to the controller connected to own or a different slave implemented in the first to third embodiments, etc.

Thus, although physical volume was the operating time or supply voltage of the Input and output devices in the embodiment, physical volume to be measured in the present invention is not limited to them, and other physical volume will be included. To be specific, there is energized time or operating time of the slave. This can be obtained by integrating time while the power source is turned ON. In addition, it may be energized time of input or output device, etc. Furthermore, it may be the number of operations of input or output device, that is, counting of the number of ON/OFF times. Furthermore, it may be the number of communications error with the master or occurrences of abnormal communications. Needless to say, it is not limited to those illustrated and listed.

In addition, another configuration for solving may be a slave to which a control device is connected and that I/O communicates to the controller via a remote line, and may be configured, comprising a measuring means of measuring physical volume of the said controller or the said slave itself, a judging means of making judgment by comparing a measured value measured with that measuring means with a standard value, and the capability of outputting to a line result of judgment made with that judging means. In this case, the said capability of outputting may be configured so that the said measured value can be output to the said line together. Needless to say, the related capability is not mandatory.

In accordance with the two configurations described above, a slave itself is capable of measuring physical volume of itself or a control device and obtaining a measured value, with the measuring means. The measuring means is executed independently of processing of the control system that is performed by sending and receiving I/O data with the controller (master unit) via usual remote line. Therefore, effects on control can be suppressed as soon as possible. Also, non-limiting data (non I/O data) such as service information that is information based on a measured value measured with the measuring means can be noticed to a predetermined recipient, by reserving it at the slave and outputting it to a line (network) with predetermined timing. This enables the recipient to collect information based on the measured value.

In addition, a destination of output of the function can be a controller, a monitor means connected to a line or a slave. Needless to say, anything other than them may be the destination. And the controller contains a master unit or PLC, etc, The monitor means also includes a configurator as well as the monitor unit.

Furthermore, the said output function can be configured to output In accordance with internal trigger such as result of internal judgment of the slave, startup of the power source, transmission timer, etc. Needless to say, it may be based on external trigger.

"Internal trigger" herein refers to the one that is based on result of execution of predetermined processing of the slave it the self and that is generated in the slave. And, to show an example of the internal trigger, there are the following: In other words, if judgment is made on whether a measured value measured at the slave reaches or exceeds a threshold, there will be that judgment result. Some use that generated signal as a trigger signal. Also, if initial processing is done with the power of slave turned on, information stored in a non-volatile memory may be output to a line or a trigger may be generated, etc. during that initial processing. In addition, some have a clock in the slave, whereby a trigger signal is regularly generated every time predetermined time elapses, or a trigger signal is generated at a predetermined time. Also, based on conditions of communications traffic with the master, some generate a trigger signal when there is extra time in processing of communications, or when abnormality such as abnormal voltage occurs.

On the other hand, "external trigger" is based on a command received by a slave via network, and is generated outside of the slave. And, as an example of external trigger, there are an information request command from the master to the slave, an information request command from the monitor to the slave, an information request command from the configurator, a command to be originated from the tool and sent by way of PLC or master, etc.

In addition, as a specific means to solve for achieving objectives of the present invention, various configurations can be taken, as described below. In other words, a processor according to the present invention is a processor that is incorporated in a master or slave connected to the network for FA (factory automation) and determines operating time of an output device connected to the slave that has been connected to the said network, comprising: a means of obtaining start time of when OUT terminal of the slave to which the said output device is connected has changed; a means of obtaining information on stop time of when IN terminal of the slave to which is connected an input device detecting that the said output device is in predetermined state has changed, and a means of calculating operating time of the said output device based on the said start time information and the said stop time information.

In addition, a node according to the present invention is a node connectable to the network for FA, wherein it is designed to comprise the capability of obtaining information on start time when the output device attached to the slave connected to the said network has changed; the capability of obtaining information on stop time when notice is received that IN terminal to which the input device is connected has changed, from the slave to which is connected the:input device detecting that the said output device is in predetermined conditions; and the computing capability that computes operating time of the said output device based on the said start time information and the said stop time information. This node may be a master or a slave, for example.

On the other hand, the slave related to the present invention is a slave to which can be connected the output device and the input device detecting that the output device is in predetermined conditions, wherein it is designed to comprise the capability of obtaining information on start time when OUT terminal to which the said output device is connected has changed; the capability of obtaining information on stop time when IN terminal to which the said input device is connected has changed; and the computing capability that computes operating time of the said output device based on the said start time information and the said stop time information. The present invention corresponds to an embodiment of the Mix slave.

In addition, another means to solve of the slave related to this information is a slave to which the output device can be connected, wherein it can comprise the capability of obtaining information on start time when OUT terminal to which the said output device is connected has changed; the capability of obtaining information on stop time when a notice is received that IN terminal to which the said input device is connected has changed, from other slave to which is connected the input device detecting that the said output device is in predetermined condition; and the computing capability that computes operating time of the said output device based on the said start time information and the said stop time information. The present invention corresponds to the embodiment of OUT slave a figure of which has been omitted.

Yet another means to solve is a slave to which can be connected the input device detecting that the output device is in predetermined condition, wherein it can comprise the capability of obtaining information on start time when a notice is received that OUT terminal to which that output device is connected has changed, from another slave to which the said output device is connected; the capability of obtaining information on stop time when IN terminal to which the said input device is connected has changed; and the computing capability that computes operating time of the said output device based on the said start time information and the said stop time information. The present invention Is embodied according to the embodiment of IN slave.

In addition, "OUT terminal or IN terminal has changed" means "a case in which It switches from OFF to ON and a case in which it switches from ON to OFF". In other words, rising or falling of a signal applies to a change that has occurred. Strictly speaking, turning ON of a signal is not necessarily synonymous with sensing of a rising signal. In other words, not only a value in standard state (steady state) will be reversed as a result of High/Low, but also rising from Low to High may be detected or falling from High to Low may be detected, if a single ON pulse (L→H→L) has occurred, for instance, and a series of signals are considered one ON signal, which will change from L→H→L in this short time (in either case, it Is judged that a signal has turned ON). On the other hand, if it is considered that, to a single ON pulse, a signal has turned OFF immediately after it turned ON, turning ON of a signal is synonymous with a rising signal, provided that OFF state is Low. This also applies to relationship between turning OFF of a signal and a falling signal.

Therefore, taking note of ON and OFF of a signal, there can be the following four patterns; "time from when OUT terminal turns ON till IN terminal turns ON", "time from when OUT terminal turns ON till IN terminal turns OFF", "time from when OUT terminal turns OFF till IN terminal turns ON", and "time from when OUT terminal turns OFF to when IN terminal turns OFF". Similarly, when taking note of rising and falling of a pulse, grouping of patterns described above can also apply, by replacing ON with rising and OFF with falling. Note that in the following descriptions, for convenience of understanding, it will be considered that turning ON of a terminal is synonymous with rising and turning OFF of a terminal is synonymous with falling, and thus they can be used in the same meaning.

In addition, respective actual time information is obtained from a timing means that can measure time of the built-in timer, counter, clock, etc. This means that there are not only absolute information such as time information but also relative information such as a timer value, counter value, etc. If it is time information, operating time can be determined by obtaining a difference between start time and stop time. In the case of a counter value, etc., operating time can be determined by obtaining a differential of the counter value between a counter value at the start time and that at the stop time. In this case, multiplying by a differential of the counter value or time required for the counter value to advance by 1, specific time information such as a few seconds, etc., can also be obtained. Also, the stopwatch function may be provided so that timing can start after the timer and counter are reset to "0" at the start time, and related timing is stopped at the stop time. By doing so, a differential with "0" at the start time, i.e., a value when stopped, can be operating time, which will obviate operations.

Thus, obtaining time information is the concept that is not limited to obtaining specific time or a counter value, but includes action of setting to "0", etc. In other words, related actions are also for indirectly obtaining information that "start time is 0". In addition, as apparent from the above descriptions, operating time is also the concept that includes not only an absolute unit system specifically indicating "x seconds" but also values correlated to time, such as a counter value.

Further, obtaining a chance (trigger) means that a predetermined terminal switches "from OFF to ON" or "ON to OFF". Determination on whether there is related trigger or not is made by monitoring ON/OFF of that terminal, or can be directly detected based on that an instruction (i.e., an instruction to change to ON/OFF) was output to that terminal, if the related terminal is owned by one. In addition, if the said terminal is provided in other slave, it is recognizable that a change has occurred in accordance with a notice from the related slave.

In addition, if a node is a master, although a notice that a predetermined terminal has changed may be received from the slave to which an input or output device is connected, OUT data is sent to the slave to which the output device is connected, thus with that transmission output, it is considered that the OUT terminal has changed, and then start time information may be obtained.

Also, the output device corresponds to the actuator 14 in the embodiment, while the input device corresponds to sensors 15 and 15' in the embodiment. And, a predetermined state of the output device detected by the input device means, for example, that predetermined action has completed, and that, in the embodiment, the mobile unit 14a has moved to a predetermined position.

In respective invention described above, and, in particular, in the slave to which the output and input devices are connected, since it is directly recognizable that OUT and IN terminals have changed, operating time can be determined with high precision, and without being affected by communications cycles, etc. In the embodiment, each function can be implemented by the application program incorporated in MPU.

And, on the precondition of each slave described above, it is better to comprise a means of storing and retaining setting information to identify normal range of the said output or input device, and of comparing the operating time obtained above with setting information described above. Since operating time can be determined with relatively good precision in accordance with the present invention, a comparison with setting:information makes it possible to judge whether or not the output or input device is normal, or whether time of replacement approaches, etc.

On the other hand, although any of respective invention described above is directed to operation of an output device (an output device to be monitored), the present invention is not limited to this, but applicable to detects time based on operation of an input device.

In other words, as an invention related to a slave, there is a slave to which can be connected first and second input devices that detect condition of the device, wherein it can be configured comprising the capability of obtaining information on start time when IN terminal to which the said first input device is connected has changed; the capability of obtaining information on stop time when IN terminal to which the said second input device is connected has changed; and the computing capability that computes operating time of the said device based on the said start time information and the said stop time information.

In addition, it is a slave to which a first input device can be connected, wherein it can be configured to comprise the capability of obtaining information on start time when IN terminal to which the said first input device is connected has changed; the capability of obtaining information on stop time when a notice is received that IN terminal to which the said second input device is connected has changed, from other slave to which the said first input device is connected; and the computing capability that computes operating time of the apparatus to be monitored by the said first and second input devices based on the said start time information and the said stop time information.

On the other hand, contrary to the above, it is a slave to which a second input device can be connected, wherein it can be configured to comprise the capability of obtaining information on start time when a notice Is received that IN terminal to which that second input device is connected has changed, from other slave to which the first input device is connected; the capability of obtaining information on stop time when IN terminal to which the said second input device is connected has changed; and the computing capability that computes operating time of the apparatus to be monitored by the said first and second devices based on the said start time information and the said stop time information.

In accordance with this invention, by employing a timing means that is built-in on the slave or node side, time from when an operation of output device has started till output of an input device changes (output device will enter a predetermined state) is measured. Hence, time based on operating time of the output device can be determined correctly.

Therefore, taking note of ON and OFF of a signal, there can be the following four patterns, "time from when IN terminal turns ON till IN terminal turns ON", "time from when IN terminal turns ON till IN terminal turns OFF", "time from when IN terminal turns OFF till IN terminal turns ON", and "time from when IN terminal turns OFF to when IN terminal turns OFF". Similarly, when taking note of rising and falling of a pulse, grouping of patterns described above can also be applied, for example, by replacing ON with rising and OFF with falling.

In addition, on the precondition of respective invention that determines operating time based on changes of the above two IN terminals, it is more preferable to configure, by comprising a comparison means that stores and retains setting information to identify normal range of the said apparatus, and compares the said determined operating time with the said setting information. In addition, it is also possible to comprise the capability of notifying a master with predetermined timing, via a network, of at least one of the said operating time and comparison results obtained with the said comparison means.

Also, a node related to the present invention is a node that can be connected to a network for FA, wherein it can be configured by comprising the capability of obtaining information on start time when IN terminal to which is connected a first input device attached to the slave that is connected to the said network has changed; the capability of obtaining information on stop time when a notice that IN terminal to which that second input device is connected has changed is received, from the slave to which the second input device is connected; and the computing capability that computes operating time of the said output device based on the said start time information and the said stop time information.

In addition, a processor related to the present invention is processor that is incorporated in a master or slave connected to a network for FA, and that determines operating time of a predetermined apparatus, wherein it can be configured comprising a means of obtaining start time when IN terminal of the slave to which is connected a first input device monitoring conditions of the said apparatus; a means of obtaining information on stop time when IN terminal of the slave to which is connected the second input device monitoring conditions of the said apparatus; and a means of computing operating time of the said apparatus based on the said start time information and the said stop time information.

In respective invention described above, although an apparatus corresponds to an output device (actuator 14) connected to OUT terminal of a slave that is connected to the same network of an input device, the present invention is not limited to this, and may be an output device connected to a network other than those to which a slave, etc. of the present invention are connected, or a separate apparatus from the network.

And, an apparatus to be monitored is not only one apparatus that can be considered physically identical, but also a plurality of apparatuses if the plurality of devices, even though they are physically separate, comprise a system that operates cooperatively or in connection with others, and the related system corresponds to an apparatus mentioned in the present invention.

In addition, it is good if there is provided the capability of notifying a master with predetermined timing, via a network, of at least one of the said operating time and comparison result obtained with the said comparison means. An alarm, etc. can be issued through execution of related capabilities, by notifying a master and thus PLC or a host computer, etc. of operating time.

Further, in a network power supply monitoring system according to the present invention, a master unit, a plurality of slaves, a network configurator and a network power supply unit are connected by way of a network, and the network power supply monitoring system shall be the premises in the network system that feeds power source to the above slaves from the above network power supply unit through the above network. And, in at least one slave of the plurality of slaves mentioned above is provided the power supply monitoring means that monitors a state of the network power source supplied through the above network from the above network power supply source, and in the above network configurator are provided a means of collecting states of the network power source of the slaves monitored by the above power supply monitoring means by communicating with the above at least one slave via above network, and a means of controlling in unified manner the said collected states of the network power source of the slave monitored by the said power supply monitoring means.

Preferably, the above power supply monitoring means comprises a voltage detection means that sequentially detects a current value of voltage of the above network power source, and a minimum selection means that selects a minimum value from the current values mentioned above which the above voltage detection means sequentially detects, wherein it can be configured so as to collect, via above network, the above current values detected by the above voltage means and the above minimum value selected by the above minimum selection means, and to display on a monitor the said collected current values of the above network supply voltage, together with minimum values mentioned above.

In such a case, the above power supply monitoring means comprises a monitoring voltage storage means that stores desired monitoring voltage, and an alarm information storage means that stores alarm information when a current value of the above network supply voltage detected by the above voltage detection means drops below monitoring voltage stored In the above monitoring voltage storage means, wherein it can be configured to monitor power source alarm conditions of each slaves mentioned above by collecting, via above network, alarm information stored in the above alarm information storage means.

In addition, the said power supply monitoring means comprises a monitoring voltage storage means that stores desired monitoring voltage, and an alarm information storage means that stores alarm information when a minimum value of the said network supply voltage detected by the said minimum selection means drops below monitoring voltage stored in the above monitoring voltage storage means, wherein it can be comprised so as to monitor power supply alarm conditions of each slave mentioned above by collecting via above network alarm information stored in the above alarm information storage means.

In the input/output device power supply monitoring system according to the present invention, at least one slave of the plurality of slaves mentioned above has a monitoring means that monitors how power source is supplied to the devices connected to that slave, and a notifying means that notifies, via above network, the above host of detection result detected by the above monitoring means in the input/output device power supply monitoring system that monitors how power source is supplied to the devices connected to the above slave in the network system that connects the host and plurality of slaves via network, wherein the above host is configured to have a monitoring means that monitors how power source is supplied to the devices connected to the above slave, based on the above detection result notified by the above communications means.

Each means that constitutes a slave and a node according to the present invention and a processor can be implemented by dedicated hardware circuit or implemented by a programmed computer.

BRIEF DESCRIPTION OF THE DRAWING

FIG. 1 shows a traditional example.

FIG. 2 shows a traditional example.

FIG. 3 shows configuration of a network system to which the first embodiment of the present invention is applied.

FIG. 4 shows one example of the internal structure of a slave related to the present Invention.

FIG. 5 is a timing chart showing how the OUT terminal and IN terminal operate.

FIG. 6 is a flow chart illustrating the function of MPU.

FIG. 7 shows one example of a transmission frame for sending operation result.

FIG. 8 shows configuration of a network system to which the second embodiment of the present invention is applied.

FIG. 9 shows one example of the data structure of the table that relates OUT slave and IN slave, FIG. 10 shows one example of a message for setting data relating OUT slave and IN slave, to a predetermined slave.

FIG. 11 illustrates a modification of the first embodiment.

FIG. 12 illustrates other modifications of the first embodiment.

FIG. 13 shows configuration of a network system to which the third embodiment of the present invention is applied.

FIG. 14 illustrates action of the present invention in the third embodiment.

FIG. 15 illustrates configuration of a network system to which a modification of the third embodiment of the present invention is applied.

FIG. 16 is a flow chart illustrating functions of an apparatus of hybrid type that incorporates respective embodiments of the present invention.

FIG. 17 shows one example of a data structure of a table that relates 2 slaves.

FIG. 18 shows one example of a message to set data for relating 2 slaves., to a predetermined slave.

FIG. 19 shows configuration of a network system to which the fourth embodiment of the present invention is applied.

FIG. 20 is a block diagram that illustrates configuration of components of each slave in the fourth embodiment.

FIG. 21 is a block diagram that illustrates configuration of components of a network configuration in the fourth embodiment.

FIG. 22 Is a flow chart that illustrates processes of the network configurator in the fourth embodiment.

FIG. 23 illustrates a specific example of power supply state display process of the network configurator in the fourth embodiment.

FIG. 24 illustrates a specific example of power supply state display process of the network configurator in the fourth embodiment.

FIG. 25 is a flow chart illustrating processes of each slave In the fourth embodiment.

FIG. 26 shows configuration of a network system to which the fifth embodiment of the present invention is applied.

FIG. 27 is a block diagram illustrating functions of the fifth embodiment.

FIG. 28 is a block diagram that illustrates a specific example of configuration of a slave in the fifth embodiment.

FIG. 29 is a flow chart for illustrating operation of the slave in the fifth embodiment.

FIG. 30 is a flow chart for illustrating operation of the master unit in the fifth embodiment.

FIG. 31 is a block diagram that illustrates other specific examples of configuration of a slave in the fifth embodiment.

FIG. 32 is a circuit diagram that illustrates a specific circuit example of the power supply for input monitoring unit to be incorporated into a slave of the fifth embodiment.

DESCRIPTION OF THE PREFERRED EMBODIMENTS

FIG. 3 shows an example of system configuration to which present invention is applied. As illustrated in the same figure, in this embodiment, not only PLC unit 10 and a master unit 11 with communications capability are integrated, but also that master unit 11 is connected with a field network (remote circuit) 12. In addition, this PLC unit 10 and master unit 11 are bus connected. In addition, Mix slave 13 to which input and output devices can connected is connected to this field network 12.

PLC unit 10 is also referred to as CPU unit, and cyclically performs I/O refresh, program execution, and peripheral processing. In addition, although the figure is omitted, besides PLC unit 10, various units are connected, as necessary, and constitute PLC. However, the related units themselves are conventionally known to the public, explanation thereof will be omitted. Also, the master unit 11 carries out master-to-slave communication with Mix slave 13, and as per a request from the master unit 11, I/O data of input and output devices connected to Mix slave 13 are sent and received. And, I/O data exchange between PLC unit 10 and master unit 11 is conducted by data communications via bus as I/O refresh processing in cyclic processing executed by PLC unit 10. Note that the above master-to-slave communications is carried out asynchronous with cyclic processing of PLC unit 10.

This Mix-slave 13 is a hybrid type in which functions of OUT slave 4b and IN slave 4a shown in FIG. 2 are incorporated, an actuator 14 is connected to OUT terminal and to IN terminal is connected a sensor 15 that monitors a position of a mobile unit 14a of the actuator 14.

FIG. 4 shows an example of internal structure of the Mix slave 13. In other words, connected to the field network 12, It comprises the transmission and reception circuit 13a, MPU13b connected to the transmission and reception circuit 13a, output circuit 13c connected to the output devices, and input circuit 13d connected to the Input devices. It further comprises an external non-volatile memory 13a or timer (internal clock) 13f, etc.

And, the transmission and reception circuit 13a has the capability of receiving a frame flowing on the field network 12, Judging by analyzing a header part if the frame is addressed to it, and finally accepting frames only addressed to it and passing them to the MPU 13b, and the capability of outputting onto the field network 12 transmission frames (e.g., a frame for sending IN data directed to the master unit 11) provided by the MPU13b.

MPU13b executes predetermined processing according to information stored in a data unit of received frames provided by the transmission and reception circuit 13a, basic capability of which is to issue a control signal to turn predetermined OUT terminal ON/OFF to the output circuit 13c according to OUT data in a data part. It also has the capability of obtaining ON/OFF state of the input terminal by way of the input circuit 13d, generating a frame to transmit, as IN data, that obtained information to the master unit 11, and passing it to the transmission and reception circuit 13a.

To control operation of the actuator 14 in the above system, a user program installed in PLC unit is executed cyclically, the master unit 11 is notified that OUT terminal of the Mix slave 13 is to be turned ON when predetermined conditions are met, and the mater unit 11 sends a predetermined frame (OUT data) to the Mix slave 13 that corresponds according to communications cycles.

Mix slave 13 turns ON OUT terminal connected to the actuator 14, according to a received frame (OUT data). This will turn a valve (not shown) ON (open), thereby advancing the mobile unit 14 forward.

On the other hand, as described in the example of the prior art, as a sensor 15 is placed together with the actuator 14, the sensor 15 will turn ON, that is, IN terminal to which the sensor 15 is connected will turn ON, when the mobile unit 14a moves to a predetermined position (a movement complete position, in the embodiment). Since MPU 13b can be obtained through the input circuit 13d that IN terminal has thus turned ON, it will transmit as IN data to the master unit 11 when the transmission timing of its own frame comes. Then, the master unit 11 will pass obtained IN data at the time of refresh processing in PLC unit 10.

As capabilities/configuration of each processing unit for executing the above respective processing and related processing is similar to that of the prior art, detailed description thereof is omitted here. Now, in the present invention, Mix slave 13 is equipped with the capability of measuring operating time of the above actuator.

In other words, as MPU 13b can recognize a state of OUT or IN terminal possessed by itself, as illustrated in FIG. 5. by using the timer (internal clock) 13f, it measures, for instance, time t from when the predetermined OUT terminal turns ON till the IN terminal turns ON, and stores the result of that measurement in the internal volatile memory 13b'. Note that we herein mean the same state by turning ON of OUT and IN terminals, and by rising of a signal.

As Mix slave 13 also retains information on normal operating time, it is provided with the capability of determining whether or not the above measurement result is within the normal operating time, and making judgment on a state of the actuator 14 (Needless to say, result of judgment will be stored and retained in the internal volatile memory 13b'). And, the above normal operating time may be either one that can be set by a threshold, such as within 10 ms, or one that can be set by using 2 thresholds, such as, from 90 ms to 100 ms. A set value to identify this normal operating time is stored in the external non-volatile memory 13e and is developed into the internal volatile memory 13b' every time the power is turned ON.

In addition, although not specifically shown, a combination of OUT and IN terminals to be monitored and the above settings are stored in the external non-volatile memory 13e as an associated table structure. And, related information is developed into the internal volatile memory 13b', but that internal volatile memory 13b' has further the table structure whereby, in effect, measurement or judgment result can also be associated and stored, And, to be specific, the processing unit 13b" of the MPU 13b is designed to execute the flow chart shown in FIG. 6. In addition, the operating time t to be operated and monitored is based on the premise that both of OUT and IN terminals have switched from OFF (Low) to ON (High), as shown in FIG. 5, that is, rising signals are tied together, and time from rising of that OUT signal to that of IN signal will be considered operating time t.

As shown in FIG. 6, it should be first determined whether or not there is rising of the applicable OUT terminal (in FIG. 3, the OUT terminal to which the actuator 14 is connected) (ST1).

And, if rising is detected, then start time (counter value) should be obtained from the timer 13f (ST2). Note that although in thin embodiment, we used the timer (counter) as we only measured operating time, we had better use the internal clock if we obtain associated data with date and time when the operating time was measured, as well.

Next, it will be determined whether or not there is rising of the applicable IN terminal (when in ON signal) (ST3). And, If rising is detected (Yes at the branch of step 3), a value of the timer 13f (stop time) is obtained, a differential from the start time obtained in step 2 is computed, and the result is stored in a result buffer.

On the other hand, as settings which provide for operating time of a normal actuator have been retained in advance, they are compared with the operating time computed in step 5, and determination is made on whether it is within the range (normal). and stored In a result buffer, together with that comparison (ST6).

And, if the above procedures were executed sequentially and repeatedly on the set objects to be monitored, and the procedures were done on all points (Yes at ST7), obtained operating time and comparison result would be stored and retained in the internal volatile memory 13bas status information of each object to be monitored (actuator 14, etc.). Since these procedures are to be executed according to an interrupt instruction, a next instruction should be waited if the procedures up to 8 were done.

On the other hand, the above stored and retained operating time or comparison result can be conveyed to the master unit 11 and thus PLC unit 10, if, for instance, the master unit 11 outputs a message with predetermined timing, and Mix slave 13 that receives the message returns, as a response to the message, operating time, etc. of an object device (address) specified by the message. Thus, it is preferable to use a message from the master unit 11, because communications on the master unit 11 side is independent from transmission of I/O data, and only information of a necessary object to be monitored can be received.

Notice of related operating time, etc. is not limited to a response to the above message, and thus it can also be conveyed, for example, through polling between the master and the slave. In other words, each slave sends IN data to the master unit 11 with predetermined timing. Therefore, as shown in FIG. 7, notification is possible by generating and sending a transmission frame that comprises, In the data unit, IN data, a state of usual input terminal plus operation result managed by that slave (operating time or comparison result, and so on). This method is preferred because it saves the master unit a need to generate and send a message requesting for acquisition for operating time.

In addition, as another scheme, Change of State can be used wherein the slave side operates as a main entity. In other words, Mix slave 13 sends the result to the master unit 11 only when any change is made to operating time or comparison result of an object to be managed by it. Adoption of this scheme can prevent wasteful data from flowing over the field network 12 and reduce traffic because the master unit can receive operating time, etc., only when necessary.

In this embodiment, as not only computation of operating time but also even status judgment are executed and stored/retained on the slave side, necessary information can be obtained without any cyclic operations in PLC unit 10 as well as any effects of communications cycles in the field network 12. Yet, since operating time is computed within the slave, operating time, even though it is shorter than one cycle of the cyclic operation, can be obtained.

FIG. 8 shows the second embodiment of the present invention. In this embodiment, instead of Mix slave, OUT slave 20 and IN slave 21 are connected to the field network 12. And, by conducting peer-to-peer communications (inter-slave communications), ON/OFF information of desired OUT terminal is given from OUT slave 20 to IN slave 21 (usually, a slave to which the sensor 15 is connected).

Then, in the processing unit of MPU in IN slave 21, procedures similar to those shown in the flowchart of FIG. 6 are executed, wherein based on ON/OFF information of OUT terminal received from OUT slave 20, start time when the applicable OUT terminal turns ON and stop time when predetermined IN terminal turns ON are obtained, and not only operating time is determined from a difference between them, but also It is compared with set values, and comparison result is retained.

Further, data transmission from OUT slave 20 to IN slave 21 can be implemented, for example, by having IN slave 21 store and retain in advance the node number of associated OUT slave and bit number of OUT terminal, etc., having IN slave 21 inquire of OUT slave 20 of the stored node number about a state of the bit number with predetermined timing, and having OUT slave 20 notify ON/OFF state of the applicable bit number as a response to that inquiry.

According to this method OUT slave 20 needs only to respond to a transmission request, and thus does not need to store and retain any information on the associated IN slave 21. On the contrary, also by having the OUT slave 20 store and retain information on the associated IN slave, for example, when desired OUT terminal turns ON, the applicable ON information may be notified to the associated IN slave 21 which gets not only start time when it receives notice on this ON information but also stop time when/the IN terminal turns ON, compute operating time from both of the times, and obtain the result of a comparison with settings as well.

Then, it is possible to have the IN slave 21, etc. store information necessary to measure operating time, by creating a table that relate "node number (MACID) and bit number of IN slave", "node number (MACID) and bit number of OUT slave" and "OUT monitoring time unit" together with relation data as shown in FIG. 9, namely, assignment number, by means of tool device, and then, based on this table, creating a message including related information In the data unit to the slave that is to store and retain and sending it to the applicable slave by way of the field network 12, through the applicable tool device or master unit 11.

Further, OUT monitoring time unit is a unit of the time to monitor conditions of other slaves, and inquires about a state of the applicable bit at related monitoring time intervals. Hence, this related OUT monitoring time unit is the minimum unit of the operating time measurement capability.

Also, in FIGS. 9 and 10, settings of relationship between OUT slave (OUT terminal) and IN slave (IN terminal) are illustrated, and if the capability of comparing operating time requested of the slave side with settings is added, settings for comparison may also be associated and transmitted.

In this embodiment, since output devices to be monitored, such as the actuator 14, etc., and input devices such as the sensor 15, etc. are connected to different slaves, communications through the field network 12 is carried out at least once. However, time lag has nothing to do with cyclic time of the user program in PLC unit 10, instead is attributed only to communications cycles, yet the communications cycles are very short compared with the cyclic time, and thus a value closer to real operating time than that managed on the user program side can be obtained.

Also, in the above embodiment, computation of operating time takes place In IN slave 21 to which the sensor 15, input device, is connected. Contrary to this, by sending ON/OFF information of the IN terminal from the IN slave 21 to the associated OUT slave 20, computation of operating time and comparison with settings may be executed on the OUT slave 20 side.

In addition, computation of operating time is not necessarily limited to the output device operating time of which in to be obtained, or a slave to which input device such as a sensor which monitors that output device Is connected, and instead may be a different slave. In such a case, ON/OFF information of OUT terminal and ON/OFF information of IN terminal is to be obtained and computed from the OUT slave 20 and IN slave 21, respectively.

Furthermore, since operating time of such a slave to which no input/output device is connected can be determined, it may be obtained with the master unit 11, by incorporating this computing capability (capability of implementing the flow chart shown in FIG. 6). Even in this case, since there is no effect of cyclic time of the user program in PLC unit, operating time can be determined with relatively good precision.

Also, if it is obtained with the master unit 11, ON/OFF information of OUT or IN terminal can be obtained by using control of the master unit 11 over transmission/reception of I/O information, although, as in the case with another slave, it can be obtained by inquiring of associated slave and responding to the inquiry, or configuring so that the associated slave notifies the master unit 11 when a predetermined terminal turns ON. In other words, operating time can also be obtained by getting start time when sending associated OUT data and stop time when receiving IN data.

Incidentally, in either of respective embodiment or modifications described above, although the examples are shown wherein time from when the output terminal turns ON (rises) till the input terminal turns ON (rises) is considered operating time, the present invention is not limited to them, and can obtain, as operating time, duration from when the output terminal changes till the input terminal changes.

In other words, as shown in FIG. 11, for example, if ON signal is given to the OUT terminal of Mix slave 13 (this can also be OUT slave 20) to which the actuator (cylinder) 14 is connected, the valve opens, thereby advancing the mobile unit (cylinder head) 14a forward. And, in the example shown in FIG. 5, the sensor 15 is designed to detect a movement complete position of the mobile unit 14a, whereas in the example shown in FIG. 11, the system is conceived wherein the sensor 15' is provided in the intermediate position of the travel path of the mobile unit 14a, this sensor 15' senses passage of the mobile unit 14a through the intermediate position X, and a sense signal is output (IN terminal of Mix slave 13 turns ON). Yet, although figures show the examples which are suitable to Mix slave 13, needless to say, the system can be equally applied. wherein OUT slave and IN slave are separately configured, similar to the second embodiment.

In this case, as the sensor 15' has a certain area of detection, output signal of the sensor 15' (input signal to IN terminal) will turn ON (rise) when the mobile unit 14a reaches the intermediate position X (when it enters the detection area of the sensor). And, if the mobile unit 14a continues to advance forward and goes out of the detection area, it will turn OFF (fall).

Now, whenever output signal of the sensor 15' turns ON (rising of IN terminal) or it switches from ON to OFF (falling of IN terminal), it can be determined that the mobile unit 14a has passed the intermediate position X. The determination can be made, depending on for what purpose operating time is obtained. And, when operating time t involved in rising of the former is obtained, operating time can be determined, using respective embodiment discussed above, by relating (tying) rising of each signal to each other.

On the other hand, to determine operating time t' involved in falling of the latter, the flow chart shown in FIG. 6 shall be a basis, and it can be obtained by replacing the branch selection of step 3 with "Does the applicable IN switch from ON or OFF?". This is the embodiment associated with OUT terminal: ON (rising) →IN terminal OFF (falling).

Furthermore, in either of respective embodiments and modifications described above, although start time of operating time is when OUT terminal triggers ON (rising), the present invention is not limited to this, and can consider a trigger when OUT terminal turns OFF (falling).

By way of an example, as shown in FIG. 11 above, when OUT terminal of Mix slave 13 turns ON and the valve turns ON, air or fluid will flow in, and the mobile unit 14a will advance forward. However, there is a cylinder of the type in which when OUT terminal turns OFF and the valve also turns OFF, the mobile unit 14a will retract and automatically return to an original position. Then, as shown in FIG. 12, not only this type of cylinder that goes back when this output is lowered, will be mounted but also the sensor 15' that senses the mobile unit 14a will be located at the intermediate position Y of the return path.

Now, let's think about a case in which operating time (t1, t1') after the mobile unit 14a begins retracting till it reaches the intermediate position Y is considered. In this case, start time is obtained as a trigger when OUT terminal turns OFF. Also, a trigger to obtain stop time uses turning ON of IN terminal (rising) or turning OFF of IN terminal (falling). When tied to ON of the IN terminal, operating time t1 can be obtained, while operating time 1' can be obtained when tied to OFF of the IN terminal.

And, as the capability of executing these procedures, the flow chart shown in FIG. 6 is a basis for the former case, and can be handled by replacing the branch selection of step 1 with "Does the applicable OUT switch from ON→OFF?". This is the embodiment associated with OUT terminal; OFF (falling)→IN terminal ON (rising). Also, in the latter case, it can be handled by further changing the branch selection of step 3 to "Does the applicable IN switch from ON→OFF". This is the embodiment associated with OUT terminal: OFF (falling) →>IN terminal OFF (falling).

Further, operating time computed in the second embodiment and modifications described above can be given to the hosting master unit 11 or PLC unit 10 with various timings such as voluntarily or as per request, etc., as shown in the first embodiment.

FIG. 13 shows the third embodiment of the present invention. In this embodiment, unlike respective embodiments and modifications described above, operating time of the apparatus (actuator 14) is to be obtained based on input signal from 2 input devices (sensors).

In other words, similar to the first embodiment, the actuator is connected to OUT terminal of Mix slave 13, and to IN terminal is connected the sensor that monitors a position of the mobile unit 14a of that actuator 14. However, in this embodiment, 2 sensors such as the first and second sensors 16a and 16b are prepared, as a sensor to be connected to IN terminal. And, the first and second sensors 16a and 16b are respectively located at X and Y, in the middle of the travel path (intermediate position) of the mobile unit 14a, whereby passage of the mobile unit 14a through the intermediate positions X and Y can be sensed. Further, the internal structure of Mix slave 13 is similar to that shown in FIG. 4.

According to this system, when OUT data turns ON, the mobile unit 14a of the actuator 14 begins to advance forward from the origin. Then, as shown in FIG. 14, as the mobile unit 14a reaches the intermediate position X, output of the first sensor 16a turns ON, and then turns OFF when the mobile unit passes the intermediate position X. This output Will simply serve as an input signal of IN terminal for the first sensor 16a of Mix slave 13.

If the mobile unit 14a further moves forward and reaches the intermediate position Y, output of the second sensor 16b turns ON and then turns OFF when the mobile unit passes through the intermediate position Y. This output will simply serve as an input signal of IN terminal for the first sensor 16a of Mix slave 13.

In this case, operating time for the mobile unit 14a to move from the intermediate position X to intermediate position Y can be determined at Mix slave 13, by relating (tying) outputs of the first and second sensors 16a and 16b, namely, signals of the corresponding to two IN terminals. Further, as to relationship between two IN terminals, similar to respective embodiments and modifications described above, since start time and stop time are obtained by using a change of IN terminal as a trigger, this change may be either OFF→ON (rising) or ON→OFF (falling).

Therefore, as shown in FIG. 14(b), if rising of the output signal (IN terminal) of the first sensor 16a is tied to rising of the output signal (IN terminal) of the second sensor 16b, time T1 will be the operating time. Also, if rising of the output signal (IN terminal) is tied to falling of the output signal (IN terminal) of the second sensor 16a, time T2 will be the operating time.

On the other hand, as shown in FIG. 14 (c), a trigger to obtain start time can be falling of the output signal (IN terminal) of the first sensor 16a. In this case, time T3 will be determined as the operating time, by tying falling of the signal of the first sensor 16a and rising of the output signal (IN terminal) of the second sensor 16b, and time T4 will be determined as the operating time by tying falling of the output signal (IN terminal) of the second sensor 16b.

Of course, operating time when the mobile unit 14a retracts can also be determined. In this case, contrary to the above case, by tying a change of output of the second sensor and that of the first sensor 16a, start time will be obtained based on the second sensor 16b, and stop time will be obtained based on the first sensor 16a.

Furthermore, in the above example, although the example has been described wherein both of the two sensors detect the intermediate positions of the travel path of the mobile unit (passage will change the signal from OFF→ON→OFF), needless to say, it is also good that one of the sensors detects a movement complete position. In addition, monitoring of the two sensors is not necessarily limited to monitoring of operation of one apparatus, and may be monitoring of operating conditions of different apparatuses. As an example, when sensors are respectively provided to monitor operations of two robots, time lag after one robot starts to operate (completion of operation) till the other starts to operate (completion of operation) may be determined. As such, operating time is not limited to that of a single apparatus (downtime), and is the concept that includes operating time of the overall system (apparatus) comprising a plurality of apparatuses, as discussed above.

Then, the capability of MPU 13b (processing unit 13b") for determining operating time based on a change in the above two IN terminals can basically be implemented with procedures similar to those of the flow chart shown in FIG. 6. And, in this flow chart of FIG. 6, steps 1 and 3 will be changed, as appropriate, by obtaining each time depending on whether two IN terminals to be tied will be ON or OFF. That is, when start time is obtained based on a change from OFF to ON (rising), the process of Step 1 will change to "Does the applicable IN switch from OFF to ON?", and when it is obtained based on a change from ON to OFF (falling), that of Step 1 will change to "Does the applicable IN switch from ON to OFF?". Furthermore, when stop time if obtained based on a change from ON to OFF (falling), the process of Step 3 will change to "Does the applicable IN switch from ON to OFF?".

Although still in this embodiment, the example was shown wherein the slave that connects the first and second sensors 16a and 16b is Mix slave 13, and thus operation of the actuator 14 is controlled based on OUT data (ON/OFF signal of OUT terminal) to be output from Mix slave 13, a control instruction to the actuator 14 may not necessarily be sent from the same slave. In such a case, the slave to whom the first and second sensors 16a and 16b are to be connected can be IN slave instead of Mix slave. Further, as other configurations and actions/effects are similar to those of respective embodiments and modifications described above, detailed discussion thereof will be omitted, Further, as shown in FIG. 15, computation of operating time based on tying of IN terminals can also be implemented in system configuration wherein the first and second sensors 16a and 16b are respectively connected to different IN slaves 21' and 21". In this case similar to the second embodiment, a value of IN (start time in the illustrated example) obtained in one IN slave 21' is to be given to the other IN slave 21". Then, operating time will be determined based on the given IN value and time information obtained on the other IN slave 21" (stop time in the illustrated example), and operation result will be sent to the master unit 11.

Of course, a relationship between the sending IN slave and the receiving IN slave can be arbitrary, and thus, as shown, start time may be sent or it may be sent from IN slave that obtained stop time to another IN slave that obtained start time. Further, as described in the modification of the second embodiment, operating time can also be determined by sending time information obtained to another slave to which these two sensors are not connected or various nodes such as the master unit 11. Still, as other configurations and actions/effects are similar to respective embodiments and their modifications described above, detailed discussion thereof is omitted.

Further, in a node into which the capability of operating real operating time of a slave or master, etc., there is a request that any of each pattern described above can be accommodated. In other words, there are 4 patterns to determine operating time after OUT terminal changes till IN terminal changes, and there are also 4 patterns to determine operating time after IN terminal changes till IN terminal changes. Thus, there are 8 types of patterns in total.

MPU 13b (processing unit 13b") can accommodate any of these 8 patterns by implementing the capabilities shown in the flow Chart of FIG. 16.

First, as preconditions, a relationship of tying of respective terminals shall be stored as setting data in the external non-volatile memory. Similar to the first embodiment, this setting data can be achieved, by creating a table that relate "node number (MACID) and bit number of the slave where a start trigger is issued, and a type of change (rising/falling), and distinction between IN/OUT terminals", "node number (MACID) and bit number of the slave where a stop trigger is issued, and a type of change (rising/falling)" and "monitoring time unit" together with relation data as shown in FIG. 17, namely, assignment number, by means of tool device, and then, based on this table, creating a message (See FIG. 18) including related information in the data unit to the slave that is to store and retain and sending it to the applicable slave by way of the field network 12, through the applicable tool device or master unit 11.

The monitoring time unit is a unit of time to monitor conditions of other slaves, and a state of the applicable bit is inquired at this monitoring time interval. Thus, this monitoring time unit will be the minimum unit of the operating time measuring capability. Furthermore, as to a type of IN/OUT terminals of a start trigger, needless to say, Mix slave has both I/O terminals.

Based on this premise, as shown in FIG. 16, settings will be read out first (ST10). The settings allow acquisition of a bit number of the terminals (IN/OUT terminals) to be monitored by one and a type of change tat should be a trigger in obtaining time. Next, it should be decided whether or not the applicable OUT/IN terminal has changed (ST11). In other words, based on setting data acquired in Step 10, it will be determined whether or not a there is rising/falling of a terminal to be monitored that will be a trigger to determine start time.

And, If there is a change (Yes at the branch selection of Step 11), proceed to Step 12 where start time is obtained. Next, it will be determined whether or not the tied applicable IN terminal changes (rising or falling is to be decided, depending on setting) (ST13). And, when rising is sensed (Yes at branch selection of Step 13), a value of the timer 13f (stop time) is obtained (ST14), its differential from the start time obtained in Step 2 is determined, operating time is computed, and the result Is stored in the result buffer.

On the other hand, settings that provide for operating time of a normal actuator have been retained in advance, the operating time computed in Step 15 is compared with the settings to determine whether or not it is in the range (normal), and the result is also stored in the result buffer (ST16).

And, if the above processes are repeatedly executed on the objects to be monitored that have been set and when the processes are executed on all points (Yes in ST17), determined operating time and comparison result are stored and retained in the internal volatile memory 13$b'$ as status information (ST18). Since these processes are executed according to the interrupt Instruction, a next instruction should be waited if processes up to Step 18 have been done.

Still, operating time computed in the third embodiment and its modification described above can be given to the hosting master unit 11 or PLC unit 10 with various timings such as voluntarily or as per a request, eta., as shown in the first and second embodiments.

As elaborately described in the above, according to the above respective embodiments, It is possible that operating time of the output device can be determined from a differential between time information of when OUT terminal of the slave to which the output device is connected has changed, and that of when IN terminal of the slave to which is connected the input device that monitors the output device has changed, or operating time of a determined apparatus (system) can be obtained from the time interval after a certain IN terminal changes till another IN terminal changes. Yet, since this computation process, etc. is done on the node side such as a slave or master connected to a network, operating time of the output device can be precisely measured without being affected y cyclic time on the PLC side.

In the above respective embodiments, operating time, that is, a measured value of physical volume related to control unit (input or output device) is not only determined at a slave, but also compared with a reference value, and then if it meats predetermined conditions, result of comparison with the reference value and/or operating time is output to the field network 12. and given to a predetermined apparatus (node) connected to that field network 12. Not limited to this, the present invention may be ouch that, for example, operating time determined without being compared with the reference value and with predetermined timing is output, letting the PLC unit 10, etc., make determination. Also, a recipient is not limited to the master unit or slave, and may be a configurator or monitor, etc., as well as other controller of the PLC.

In addition, as information to be notified, unique information (non-control information) of a control device had better be sent in addition to the result of determination and/or operating time. In other words, if a device has been set so that time of replacement approaches when operating time exceeds a reference value, for instance, a user will be able to know in advance information on a failed device, by outputting together unique information (device name, manufacturer name, model, manufacture number) that indicates ID of the device. Therefore, when visiting a site, he/she can carry with him/her parts for replacement of this device or a device to be replaced, and thus carry out maintenance quickly. And, by storing and retaining in advance unique information on a control device connected to him/her, a user can cope by reading it out as necessary.

In addition, physical volume related to a control device to be measured or a slave itself in the present invention is not limited to the above operating time, and there is a variety, such as supply voltage to be supplied to a slave, etc., which will be discussed later FIG. 19 is a system configuration view showing the entire configuration of the fourth embodiment. In this embodiment, there is a network system to which one master unit 30 and a plurality of slaves that are distributed in several places are connected by way of the field network 32. Such devices as input or output devices (Input/output device 34) are connected to the slave 33, and I/O data of the input/output devices 34 is sent to and received from the master unit 30. This is also same in respective embodiments and their modifications described above.

Furthermore, although not shown in a figure, PLC unit is connected to this master unit, as In the above respective embodiments, and constitutes PLC. In addition, the PLC unit and master unit 30 are not necessarily connected directly to constitute the PLC, and thus the master unit 30 may be independent of the PLC. In such a case, I/O data will be exchanged via field network 32 or a different network.

Also, the network power supply apparatus 35 is placed in the neighborhood of the master unit 30. This network power supply apparatus 35 is connected to the field network 32, by way of which supply voltage is supplied to the master unit 30 or slave 33. Furthermore, power source is also supplied to the Input/output device 34 by way of this slave 33. In addition, to this field network 32 is connected the network configurator 36 to which power source is also supplied from the network power supply apparatus 35.

The above network configurator 36 is to monitor conditions of such network units as the master unit 30, slave 33, etc., and to read and write parameters.

In addition, the slave 33 is comprised of a remote I/O terminal, an environment-resistant terminal, a remote adapter, an I/O link unit, a sensor terminal, a analog input terminal, an analog output terminal, a temperature input terminal, RS232C unit, etc. that constitute this system.

In the above configuration, each of a plurality of slaves 33 executes operations such as communications, etc., by using the network power source being supplied from the network field power supply apparatus 35 through the field network 32. However, this network power supply is subject to different voltage drops, depending on a distance from the network power supply apparatus 35. In this embodiment, since the network power source is also supplied to the Input/output device 34, a voltage drop will increase accordingly when the input/output device 34 consumes power.

And, since guaranteed operating voltage of the above plurality of slaves 33 is determined to be, for instance, 24V to 11V, communications will be disabled when the supply voltage at a position where it is supplied to the slave of the above network power source drops below 11V, for instance.

Hence, in this embodiment, the power supply monitoring means is provided to monitor conditions of the network supplies, respectively added to each slave 33. And, the configuration is such that power supply state information indicating conditions of the network power supply of each slave 33, which are monitored by the power supply monitoring means, is collected by the network configurator 36 by way of the field network 32, so as to control conditions of the network supply of each slave in a unified way.

FIG. 20 is a block diagram showing configuration of components of each slave 33 in the PLC system shown in FIG. 19. In FIG. 20, the slave 33 is configured comprising a voltage monitoring unit 33$a$, maximum/minimum value retention unit 33$b$, current value storage unit 33$c$, monitoring voltage storage unit 33$d$, comparison unit 33$e$, alarm status storage unit 33$f$, and communications control unit 33$g$.

Now, the voltage-monitoring unit 33$a$ monitors the network power source supplied from the field network 32, and detects its current value, and maximum and minimum values. And, the maximum and minimum values of voltage of the network power supply detected by the voltage monitoring unit 33a are retained in the maximum/minimum value retention unit 33b. A current value of voltage of the network power supply detected by the voltage monitoring unit 33a is also stored in the current value, storage unit 33c.

This slave 33 communicates to the network configurator 36 voltage information, one of the non-control system information, which :s not I/O data stored in the above maximum/minimum value retention unit 33b and current value storage unit 33c so that the network configurator 36 can check contents. It also has the capability of judging whether or not current supply voltage is normal, and storing the judgment result. Further, in the completely abnormal condition in which supply voltage will be disabled, judgment on whether or not it is normal cannot be made because the apparatus itself does not operate. Hence, in this embodiment, a state close to the voltage wherein supply voltage drops and is disabled Is regarded as abnormality, namely, a state that needs some alarm, and such a state, if it occurs, is to be recorded.

And, in this embodiment, monitoring voltage that serves as a criterion to Judge whether or not it is in a state that needs an alarm such as above, namely, a state in which the apparatus? seems to be disabled though it is still operating is stored in the monitoring voltage storage unit 33d. Further, this monitoring voltage is set with dipswitches (not shown) of the slave 33 in this embodiment.

When the guaranteed operating voltage is 24V to 11V, the monitoring voltage stored in this monitoring voltage storage unit 33d will be set to a value which Is slightly higher than 11V, the lower limit of the voltage. As an example, it Is set to 12V. With this setting, it would become possible to communicate to the network configurator 36 conditions of the network power source supplied to this slave 33, before communications is disabled due to lowered supply voltage following voltage drop.

The comparison unit 33e compares a current value of the voltage of the network power supply stored in the current value storage unit 33c with the monitoring voltage stored in the monitoring voltage storage unit 33d, and outputs alarm status when a current value of the voltage of the network power supply falls short of the monitoring voltage, which is a comparison reference value.

This alarm status output from the comparison unit 33e is stored in the alarm status storage unit 33f. Now, alarm status in the alarm status storage unit 33f can be stored as error flag.

Information on supply voltage, including alarm status (error flag) which is judgment result based on the above monitoring voltage is retained by the slave 33. In this embodiment, this information retained by the slave is to be passed to the network configurator 36 as a response that is sent in response to a request from the network configurator 36. In other words, maximum/minimum values of the voltage of the network power source that is retained in the maximum/minimum value retention unit 33b and to be supplied to the slave 33, a current value of the voltage of the network power supply that is stored in the current value storage unit 33c and supplied to this slave 33, and alarm status stored in the alarm status storage unit 33f are red out to the communications control unit 33g from the maximum/minimum value retention unit 33b, current value storage unit 33c and alarm status storage unit 33f by the read out command from the network configurator 36 shown in FIG. 19, and is sent, as a response, to the network configurator by way of the field network 32.

In addition, similar to a response to be Issued following reception of a command issued from the network configurator 36, as discussed above, timing to communicate such information on voltage is not limited to a trigger from the external, and may be configured so that subject to an internal trigger, namely, a change to the judgment result, the slave 33 voluntarily sends. This means that supply voltage to the slave 33 may be monitored, and when it drops below a certain threshold (monitoring voltage). alarm status (error flag) and other voltage information will be sent to the network configurator 36.

Note that the above voltage-monitoring configuration shown in FIG. 20 can also be provided in the master unit 30. With this configuration, similar to the above slave 33, voltage to be supplied to the master unit 30 from the network power supply apparatus 35 can be monitored.

FIG. 21 is a block diagram showing configuration of components of the network configurator 36 in this embodiment. As shown in FIG. 21, the network configurator 36 is configured comprising an input unit 36a, a communications control unit 36b connected to the field network 32, and a display unit 36c. Specific capabilities of each unit are discussed below.

The input unit 36a is a man-machine interface such as a keyboard, a pointing device, operating panel, etc. and has the capability of passing to the communications control unit 36b a voltage display instruction of this system received with manipulations of a user.

With the voltage display instruction provided from the input unit 36a, the communications control unit 36b sequentially issues to each slave 33 a current value read-out command, a maximum value read-out command, a minimum value read-out command, and alarm statue read-out command, and collects a current value, maximum/minimum values and alarm status of the voltage of the network power supply at each slave 33, upon receipt of a response to these from the slave 33. Then, it passes collected information to the display unit 36c.

The display unit 36c can be display equipment such as a display, and outputs and displays conditions of the network power supply of each slave 33 received from the communications control unit 36b. This enables a user to be informed of current condition of voltage. Thus, communications of a separate system from cyclic processes of the PLC unit enables the network configurator 36 to collect conditions of each slave 33, independent of usual transmission/reception of I/O data, and thus a user can achieve centralized control.

Next, the above processes, namely, specific procedures to implement the capability of the network configurator 36's collecting information on voltage of supply power source retained by each slave 33 will be discussed.

FIG. 24 is a flow chart showing processes of the network configurator 36. First, it should be determined whether or not the voltage display instruction of each slave 33 has been entered from the Input unit 36a (ST 21). If no voltage display instruction has been entered (NO at the branch selection of Step 21), entry of the voltage display instruction should be waited again, whereas if it is determined that the voltage display instruction has been entered (YES at the branch selection of Step 21), the unit number n of the slave will be set to "1"(ST 22). Next, it should be determined whether or not the unit number n is the last number. Further, if this is executed following Step 22, the branch selection should be NO because n-i and it is not the last number.

And, if the unit number n Is not the last one (NO at Step 43), the current value read-out command that instructs read-out of a current value of the voltage of network power source being supplied to the slave 33 will be issued to the slave with the unit number n (ST 24).

Then, it should be determined whether a response to the current value read-out command from the slave 33 with the unit number n has been received (ST 25). If a response has not been received (NO at Step 25), this response should be waited. If a response has been received (YES at Step 25), the maximum value read-out command that instructs read-out of a maximum value of the voltage of network power supply of the slave 33 will be issued to the slave 33 with the unit number n (ST 26).

And, it should be determined whether a response to this maximum value read-out command has been received from the slave 33 with the unit number n (ST 27). If a response has not been received (NO at Step 27), this response should be waited. If a response has been received (YES at Step 27), the minimum value read-out command that instructs read-out of the minimum value of the voltage of network power source being supplied to the slave 33 will be issued to the slave 23 with the unit number n (ST28).

Then, it should be determined whether a response to this minimum value read-out command has been received from the slave 33 with the unit number n (ST29). If a response has not been received (NO at Step 29), this response should be waited. If a response has been received (YES at Step 29), the alarm status read-out command that instructs read-out of the alarm status of the network source being supplied to the slave 33 will be issued to the slave with the unit number n (ST 30).

And, it should be determined whether a response to this alarm status read-out command has been received from the slave 33 with the unit number n (ST 31). If a response has not been received (NO at Step 31), this response should be waited. If a response has been received (YES at Step 31), a user will return to Step 23 after incrementing the unit number n to n+1 (ST 32). Further, if a response has been received at each process step described above, content that has been sent as the response should be extracted, and stored/retained.

The above step will be repeatedly executed at Step 23 until it is determined that the unit number n is the last number. Further, the last value of the unit number n should be stored and retained in advance. And, strictly speaking, determination on "is it last?" at this Step 23 Will be "Is last number exceeded?" or "Were processes executed till the last number?". Then, if processes were executed till the last number (YES at Step 23), a state of the network power supply of each slave 33 would be displayed based on the current value, maximum value, minimum value, and alarm status that have been obtained by executing each process described above (ST 33). This will end a series processes involved in entry of this voltage display instruction, such as issuance of commands, reception of responses, and display of information obtained from responses. Further, although commands are issued to the slaves in the above description, information on the network voltage to be supplied to the master unit can be obtained.

Specific examples of a display onto the display unit 36c of a state of power supply conditions obtained as a result of executing the process at this Step 33 include one shown in FIG. 23, for instance. Further, herein information on the network voltage supplied to the master unit 30 shall have also been obtained. In the upper column of the display screen 37 shown in FIG. 23, connection configuration of this FA system comprised of the master unit 30 (M) and respective slaves 33 (S1 to S6) is illustrated, while in the lower column the maximum value L1, current value L2 and minimum value L3 of the network power source supplied to each unit are shown in a line graph.

L4 is monitoring voltage stored in the monitoring voltage storage unit 33d. When the minimum value L3 or the current value L2 falls short of the monitoring voltage L4, conditions are abnormal and thus the predetermined alarm screen will be displayed, depending on alarm status.

Further, selection had better be made on whether an alarm is issued by comparing the monitoring voltage L4 with the minimum value L3, or with the current value L2, depending on configuration of FA system or electric characteristics, etc. of external devices connected to the slave 33. In addition, when a compared value of either minimum value L3 or current value L2 also falls short, an alarm may be issued accordingly.

According to such configuration, conditions of the network power supply of each slave 33 can be visually displayed to a user in terms of a relationship among the maximum value L1, minimum value L3, current value L2 and monitoring voltageL4.

Needless to say, display examples of power supply conditions are not limited to those described above, and thus FIG. 24 shows another example. That is, in the upper column of the display screen 37 shown in FIG. 24, connection configuration of this FA system comprised of the master unit 30 (M) and slaves (S1 to S6) is illustrated. In this respect, this is similar to what was described above. And, in the lower column the maximum value L1', current value L2' and minimum value L3' of the network power source supplied to each unit are shown in a line graph.

L4 is the monitoring voltage stored in the monitoring voltage storage unit 33d. If there is any unit wherein the minimum value L3 or the current value L2 falls short of the monitoring voltage 4L, conditions are abnormal, and thus the predetermined alarm screen will be displayed, depending on alarm status.

Further, selection had better be made on whether an alarm is issued by comparing the monitoring voltage L4 with the minimum value L3, or with the current value L2, depending on configuration of FA system or electric characteristics, etc. of external devices connected to the slave 33. In addition, when a compared value of either minimum value L3 or current value L2 also falls short, an alarm may be issued accordingly.

Further, although no alarm status is displayed in FIGS. 23 and 24, this alarm status can be configured to appear according to connection configuration of FA system shown in each figure. It may be configured to appear on a display screen different from those of each Fig.

Incidentally, a current value of the network supply voltage varies all the time, depending on a running state of external devices such as motors, etc., connected to the slave 33, or load conditions of other slaves, etc. connected to the middle of the electric cable of the network that extends from the network power supply apparatus 35 to the slave 33. This is because if a voltage drop during an extremely short period does not result in paralysis or deteriorated performance, it is preferable to only detect, as abnormal conditions, voltage by which the voltage detection means (voltage monitoring unit) continues more than predetermined time.

In addition, the maximum and minimum values of the network supply voltage are useful to keep track of a range of voltage fluctuations, and the current value is useful in grasping the current situations. If an alarm were issued when a current value of the network supply voltage dropped below the monitoring voltage, management on the safer side would be possible.

On the other hand, processing at slaves 33 is as shown in the flow chart of FIG. 25. In other words, it should be first determined whether a command has been received from the network configurator 36 (ST 51). Now, if a command has not been received from the network configurator 36 (NO at Step 51), a user will return to Step 51 again. This means that reception of a command should be waited with processing in this Step 51.

If it is determined at Step 51 that a command has been received from the network configurator 36 (YES at Step 51), then, it should be determined whether this received command Is the current value readout command (ST 52). Now, if the received command is the current value readout command (YES at Step 52), not only a current value of the network power supply of this slave stored in the current value storage unit 330 will be read out, but also the current value will be returned to the network configurator 36 as a response to the command received by the communications control unit 33g (ST 53). This will end the processing involved in reception of the command this time.

In addition, If the received command is not the current value readout command (NO at Step 52), a user will jump to Step 54 to determine whether the received command is the maximum value readout command (ST 54). Then, if this received command is the maximum value readout command (YES at Step 54), the maximum value of the network power source supplied to the slaves 33 stored in the maximum/minimum value retention unit 33b will be returned to the network configurator 36 as a response (ST 55). This will end the processing involved in reception of the command this time.

Also, if it is decided at the branch determination at Step 54 that the received command is not the maximum value readout command, a user will jump to Step 56 to determine whether the received command is the minimum value readout command (ST 56). Then, if this received command is the minimum value readout command (YES at Step 56), the minimum value of the network power source supplied to the slaves 33 stored in the maximum/minimum value retention unit 33b will be returned to the network configurator 36 as a response (ST 57). This will end the processing involved in reception of the command this time.

Also, if it is decided at the branch determination of Step 56 that the received command is not the minimum value readout command, a user will jump to Step 58 to determine if the received command is the alarm status readout command (ST 58). Then, If this received command is the alarm status readout command (YES at step 58), alarm status of the network power supply of this slave stored in the alarm status storage unit 33f will be returned to the network configurator 36 as a response (ST 59). This will end processing involved in reception of the command this time In addition, if at the branch determination of Step 58, NO is selected, namely, the received command is not the alarm status readout command, the command received this time is not the command to request readout of any information on the network voltage, other processing associated with that received command will be executed (ST 60). Then, a user will return to Step 51 and wait for reception of a next command.

In the embodiment described above, the monitoring voltage is manually set for each slave, with the manipulation switch (dipswitch or rotary switch, etc.) on the slave. However, this monitoring voltage may be set through manipulation from the network configurator 36, via field network 32. Then, if the monitoring voltage is set through manipulation from the network configurator 36, it can be set for every slave connected to the network, or can be set altogether if operating voltage of respective slaves is identical.

In addition, when only a slave remote from the network power supply apparatus 35 or a slave connected to an external device load current of which is large Is provided with the network power supply monitoring capability, the network power supply monitoring information of such a slave may be sent to the network configurator 36 and displayed.

Also, even when all the slaves 33 are provided with the network power supply monitoring capability, by sending to specific slaves a command to collect the network power supply monitoring information, the network configurator 36 may selectively display the network power supply monitoring information of these specific slaves.

Further, in the above embodiment, all of descriptions concentrated on the cases in which the slaves 33 had the power supply monitoring means. Incidentally, in some network system configurations, slaves with the power supply monitoring means and those without the power supply monitoring means are mixed together. In such a case, as a traditional slave returns an error response to the current value readout command from the network configurator 36, the network configurator 36 can determine that the said slave is a traditional slave without the power supply monitoring means. In addition, as the network configurator 36 can distinguish types of slaves connected via field network, it is also possible to issue the current value readout command, etc., only to the slaves with the power supply monitoring means. Therefore, the present invention can also be applied to the network system wherein slaves with the power supply monitoring means and traditional slaves without the power supply monitoring means are mixed together.

Furthermore, a master unit in the present invention is not limited to only one, and can be applied to the PLC system to which a plurality of master units is connected.

As discussed above, according to the above embodiment, when a system is constructed, supply state of the network power source can be monitored in one place in a centralized way, thereby reducing time for construction of a system. Also, supply state of the network power source during operation of a system can be checked at any time, such an effect of facilitating service maintenance of the system, etc. can be produced.

Furthermore, in the above embodiment, although a collecting device is described as a network configurator, information stored in each slave may be sent to the monitor connected to the field network and displayed on that monitor. Also, of course, transmission to and reception from the master unit of such non-I/O data may be conducted.

And, also in this embodiment, since information on voltage supplied to slaves, etc. is not only detected but also stored/retained on the slave side, and collection/display of the information is done based on a request, etc., from a configurator, there is no effect on cyclic operations on PLC side.

FIG. 26 and figures thereafter show the fifth embodiment of the present invention. In this embodiment, physical volume related to control device or slave itself to be measured shall be I/O power supply to be supplied to the Input/output devices connected to the slaves.

As shown in FIG. 26, this PA system is configured with one master unit 40, which is a host station, connected to a plurality of slaves 43 and the field network 42 that are distributed in several places. Furthermore, similar to the respective embodiments described above, a field bus (for example, DeviceNet (registered trademark), etc.) is used as a field network 42 that is a network between the master unit 40 and each other of a plurality of slaves 43.

Now, the master unit 40 constitutes the PLC master in this FA system. Furthermore, similar to FIG. 3, etc., it is linked with the PLC unit.

In addition, slaves 43 not only enter a signal from such a detector as a sensor, etc., but also output a signal to such a control device as a valve, etc. In other words, in order to implement control by this FA system, predetermined input/output devices 44 are connected. These input/output devices 44 include an input device 44*a* such as a sensor and an output device 44*b* such as a valve/motor, etc. Then, output of the input/output device power supply apparatus 45 is connected to each slave 43, and power is supplied to each input/output device 44 from that input/output device power supply apparatus 45.

Further, as shown in FIG. 27, the input/output device power supply apparatus 45 is provided with a power supply unit for input 45*a* to supply to the input device 44*a* such as a sensor, etc., and a power supply unit for output 45*b* to supply to the output device 44*b* such as a valve, etc. Then, voltage supplied from the power supply unit for input 45*a* and power supply unit for output 45*b* is also given to the input/output device power supply monitoring unit 43*a*. This enables the power supply for input/output monitoring unit 43*a* to monitor a voltage value and determine on ON/OFF by comparing it with a threshold.

Furthermore, although supply of power source to slaves 43 themselves is not shown, similar to the above fourth embodiment, power can also be supplied from the network power supply apparatus 35 connected to the field network 32. Needless to say, power can be separately supplied to power supply terminals of the slaves, without going through the network. In this case, the slaves will be provided with terminals for the input/output device power supply and power supply terminals for slaves, separately and independently. Also in this case, as a separately prepared power supply for slave enters the slaves via power supply terminals, not only voltage of a terminal of that power supply for slave may be measured and compared with a reference value, but also comparison result may be notified to the master unit or monitor, configurator, etc. via network.

In the above configuration, a plurality of slaves 43 are provided with the input/output device power supply monitoring unit 43*a* that monitors whether respectively input power supply supplied from the power supply unit for input 45*a* and output power supply supplied from the power supply unit for output 45*b* is turned ON or OFF, respectively (See FIG. 27).

Each slave 43 retains input/output device power supply state information that shows ON or OFF state of the input and output power supplies monitored by this input/output device power supply monitoring unit 43*a*. Then, this input/output device power supply state information (I/O power supply information) is sent to the master unit 40 by way of the field network 42 as per request from the master unit 40. This enables the master unit 40 to monitor a state of the input/output device power supply (I/O power supply) of a plurality of slaves 43.

With the above configuration, in the master unit 40 when no signal is sent from the input device 44*a* such as a sensor, etc., the master unit can quickly judge whether it is because the power supply for input of slaves 43 is turned OFF, or because a signal cannot be really entered due to a failure, etc., of the input device 44*a* such as a sensor, thereby Improving reliability of the system.

Similarly, when it cannot confirm operation of the output device 44*b* such as a valve although a signal to drive a controller (output device 44*b*) such as a valve, etc. is output to the slaves 43, the master unit can quickly judge whether it is because the power supply for output of the slaves 43 is turned OFF, or a signal cannot be really output to the slaves 43. This can also improve reliability of the system.

In the PLC unit (not shown) (that incorporates information from the input devices, executes a control program and outputs execution result to the output devices) connected to the master unit 40, it will be possible to know supply state of the power source of a device connected to the slaves 43 by way of the master unit 40. Therefore, since the control program (to be programmed by a ladder language, etc.) of the PLC unit (CPU unit) makes it possible to cope when power supply of a device connected to the slaves is turned OFF, reliability of the system can be improved.

FIG. 28 is a block diagram showing an example of specific configurations of the slaves 43 shown in FIG. 27. Further, although FIG. 28 shows a case in which to the slaves 43 is connected the sensor 44*a* that is a detector, they can be configured when a valve, etc., which is a controller, is connected and when both of a sensor, which is a detector, and a valve, which is a controller, are connected. However, when a valve, etc. is Connected, not input power supply but output power supply will be monitored.

First, a sense signal of the sensor 44*a* is given to the input unit 43*b*. A sense signal from the sensor 44*a* that the input unit 43*b* acquired, namely, ON/OFF information, is given to the master unit 40 via communications control unit 43*c* and by way of the field network 42. Although I/O data is thus sent, such processing function is similar to the traditional one. And, although the power supply for input is given to the sensor 44*a* via slaves 43, it is given to the power supply for input monitoring unit 43*a*'. The power supply for input monitoring unit 43*a*' monitors ON and OFF of the power supply for input to be entered from the external all the time, based on voltage of the above given power supply for input.

Then, when the communications control unit 43*c* receives a request sent from the master unit 40 by way of the field network 42, the communications control unit 43*c* will get information indicating ON and OFF of the power supply for input that was monitored by the power supply for input monitoring unit 43*a*', and send this information to the master unit 40 by way of the field network 42.

Of course, although FIG. 28 illustrated the monitoring capability for the power supply for input, in the case of the slaves to which the output device is connected, as described above, the power supply monitoring unit for output will be provided, ON/OFF Information of the power supply for output will be monitored, and that ON/OFF information will be returned as a response, depending on a request from the master unit 40. And, it is the input/output device power supply monitoring unit 43*a* that collectively explains monitoring of those power supply shown in FIG. 27 for input and power supply for output. This means that although this FIG. 27 illustrates an example in which only the input/output device monitoring unit 43*a* is provided in the slaves 43, in practice, similar to FIG. 28, the communications control unit or the input unit or output unit for controlling I/O data of the input/output devices are also provided. Then, flow charts of FIGS. 29 and 30 show an example of the processing algorithm of the master unit 40 and the slaves 43 that carry out management/transmission and reception of ON/OFF information of the input/output power supply.

FIG. 29 is a flow chart for describing operation of the slaves 43. As shown in FIG. 29, first, the input/output power supply monitoring unit 43a determines whether the power supply for input and power supply for output are turned ON (ST 61). To make this decision, various techniques can be adopted: a threshold close to 0V may be set and it is determined that they are ON when it is exceeded. Or, as discussed later, configuration shall be such that the power supply for input and power supply for output are applied to the base voltage of the transistor, and thus it is determined that the power supplies are turned ON when the transistor is turned ON. In either case, it is determined that voltages are ON when comparison with some reference value is made and it turns out that a reference value for determination is abnormal.

When the power supply for input or power supply for output is ON (YES at Step 61), associated error flag of the power supply for input and power supply for output is set to OFF (ST 62). Also, when the power supply for input or power supply for output is OFF (NO at Step 61), the error flag associated with the power supply for input and power supply for output that turned OFF is set to ON (ST 63).

Next, it is determined whether there is a request for the input/output device power supply state information from the master unit 40 by way of the field network 42 (ST 64). Now, if there is no request for the input/output device power supply state information (NO at Step 64), a user will return to Step 61 to go to a next process.

On the other hand, if a request for the input/output device power supplies state information has been received (YES at Step 64), the above error flag is sent to the master unit 40 as a response and the input/output device power supply state information, by way of the field network 42. Then, a user will return to Step 61 to go to a next process.

FIG. 30 is a flow chart for describing operation of the master unit 40. First, it is determined whether there is an instruction to check the input/output device power supply (ST 71). This instruction can be, for example, a request from the PLC unit side. In addition, the master unit 40 is provided with manipulation buttons for the instruction to check the input/output device power supply, and by pressing of the manipulation buttons, it can be determined that there is the instruction to check the input/output device power supply.

If there is no instruction to check the input/output device power supply (NO at Step 71), a user will return to Step 71 to wait for the instruction to check the input/output device power supply. And, If it is determined that there is the instruction to check the input/output device power supply (YES at Step 71), then, the unit number of the slaves 43 will be set to "1"(ST 72). Next, it is determined whether or not the unit number n is the last number (ST 73). In addition, if this is executed following Step 72, then, n=1 and it is not the last number. Thus, NO will be selected at the branch determination.

And, the unit number n is not the last one (NO at Step 73), a request for readout of error flag of the input/output power device power supply will be issued to the slave with the unit number n (ST 74), and the error flag of the input/output device power supply will be read out from the unit number (Step 75).

And, a process associated with this read out error flag of the input/output device power supply is executed (ST 76), then the unit number will be incremented to n+1 (ST 77), and a user will return to Step 73.

The above process will be repeatedly executed till it is determined at Step 73 that the unit number n is the last number. Further, the last value of the unit number n should be stored/retained in advance. And, strictly speaking, determination on "is it last?" at this Step 73 will be "Is the last number exceeded?" or "Were processes executed till the last number ?". Then, if processes were executed till the last number (YES at Step 73), a series of processes involved in this instruction to check the input/output device power supply will end.

The above process associated with the error flag in Step 76 is executed, for example, based on the ladder program installed in the master unit 40. Depending on a value of the error flag, "The input/output device power supply is normal", "The power supply for input of No. 3 slave is turned OFF", etc. will be notified, and if it is inappropriate to continue operation, such process as stop of operation will be executed.

Further, in the flow chart show in FIG. 30, although it is such configured that the check of input/output device power supply of the slaves of this system will be sequentially executed on all of the slaves, it may be configured so that the check will be executed only on the input/output device power supply of a specific slave, as necessary.

Although the above fifth embodiment is predicated on the system of a type that supplies power source to the input/output devices from the Input/output device power supply apparatus 45, as described In the fourth embodiment, even in the system wherein power source is supplied to the input/output devices from the network power supply apparatus by way of the slaves, it may be configured so that the slaves will monitor ON or OFF state of the power supply to the input/output devices and notify the master unit 40, etc. of the result by way of the field network 42. As an example, this can be achieved by making the internal configuration of the slaves 43 according to FIG. 31.

Although FIG. 31 shows the case in which the sensor 44a, a detector, is connected to the slaves 43, similar configuration will be possible in the case a valve, etc., which is a control unit, is connected, or In the case both a sensor, etc., which is a detector, and a valve, which is a detector, are connected. However, If a valve, etc. is connected, not the power supply for input but the power supply for output will be monitored.

First, a detection signal of the sensor 44a is given to the input unit 43b. The detection signal from the sensor 44a that the input unit 43b acquired, namely, ON/OFF information, is given to the master unit 40 via communications control unit 43c and by way of the field network 42. Although I/O data is thus sent, such processing function is similar to the traditional one. And the power supply for input is supplied to the slaves 43 from the network power supply apparatus 47 connected to the field network 42 by way of such field network 42. Then, it is further given to the sensor 44a by way of the slaves 43d. The short protection circuit 43d is provided in the middle of this power supply line to the sensor 44a in the slaves. When this short protection circuit 43d senses that a short has occurred on the sensor 44a side, for instance, control is executed so that it breaks the circuit (breaks the switch). This means that the network power supply supplies power source to not only the sensor 44a and the slaves 43 to which that sensor 44a Is connected, but also other slaves connected to the field network 42. Therefore, should a short occur in the sensor 44a, the condition would affect the power supply system of the entire network. This Is because the short protection circuit 43d is provided, thereby Isolating from the power supply system the sensor 44a in which a short occurred. Furthermore, as configuration of this short protection circuit 43d is publicly known, detailed description of its internal configuration is omitted.

And, by branching from the short protection circuit 43d to the supply line to the sensor 44a, voltage Is given to the power supply for input monitoring unit 43a'. Based on the above given voltage of the power supply for input, this power supply for input monitoring unit 43a' monitors ON and OFF of the power supply for input entered from the external all the time.

This configuration would allow monitoring of ON and OFF of the power supply for input, including operating state of he above short protection circuit 43d. This means that the power supply for input monitoring unit 43a' monitors ON and OFF of the power supply for input, and sends back information on state of voltage, which is result of that monitoring, to the master unit 40, etc. as per request from the master unit 40, etc. Then, the master unit 40 that received by way of the field network 42 information indicating that the power source supplied to the sensor 44 from the slaves 43 is turned OFF can determine that the short protection circuit 43d of the said slaves 43 has operated and become broken. This means that in this embodiment, the slaves 43 are also made to work by the network power supply. Therefore, if there is a response from the slaves (notice of information), it can be said that the network power source is supplied to at least the slaves 43, and then if the supply power source to the sensor 44a is turned OFF, it can be determined that the short protection circuit 43d is operating.

Further, information from the slaves 43 in response to a request from the master unit 40 is transmitted via communications control unit 43c, similar to the slaves In FIG. 28. This means when the communications control unit 43c receives a request from the master unit 40, it will get monitoring result of the power supply for input monitoring unit 43a' and send it to the master unit 40 via field network 42.

Furthermore, rather than simply making determination on ON/OFF, similar to monitoring of the network power supply of each slave in the fourth embodiment, it may be judged whether or not a voltage value of the power supplies for input/output exceeds predetermined thresholds, and then determination such as that it is close to the lower limit although the input/output devices can operate may be made and notified.

Incidentally, as specific circuit configuration for implementing the above input power supply monitoring unit 43a', configuration shown in FIG. 32 is possible, for Instance this circuit is also applicable to the input power supply monitoring unit 43a' in either FIG. 28 or FIG. 31. Also, although this FIG. 32 shows the monitoring circuit for the power supply for input, the monitoring circuit for the power supply for output can also be configured similarly.

As shown in FIG. 32, the monitoring circuit for this power supply for input serially connects the light emitting diode 52a comprising the resistance 51 and photocoupler 52 to the path branched from the power supply line to the input device 44a, thereby to the earth. It also serially connects the pull-up resistance 53 between the phototransistor 52b and supply voltage Vcc that comprise the photocoupler 52. Then, it connects a contact of the pull-up resistance 53 and the phototransistor 52b to the input terminal of CPU 54 of the slaves 43.

With this configuration, when the power supply for input is ON, current runs from the power supply for input to the earth by way of the resistance 51 to the light emitting diode 52a of the photocoupler 52 which then turns ON. This turns ON the phototransistor 52 of the photocoupler 52, earth is dropped to the internal terminal of the CPU 54, and then a low level signal is input.

Also, when the power supply for input is OFF, there is no longer current, running from the power supply for input to the earth by way of the resistance 51 the light emitting diode 52a of the photocoupler 52 which thus turns OFF. This turns OFF the phototransistor 52b and opens the input terminal of the CPU 54, then due to action of the pull-up resistance 53, a high level signal is input to the input terminal of the CPU 54.

Therefore, CPU 54 monitors level of a signal input to the input terminal, and can detect that the power supply for input is ON when the signal is at low level and that the power supply for input is OFF when it is at high level. Then, the operating voltage (voltage to turn ON) of the phototransistor 52b will be a reference value of ON and OFF of the voltage for input.

Further, there is more than one input device to be connected to the slaves, supply from the slaves of power source may be monitored individually for every input device or for all of the input devices altogether. Similarly, if there is more than one output devices to be connected to the slaves, supply from the slaves of the power source may be monitored individually for every output device or for all of the output devices altogether.

Furthermore, as in the modifications of the fifth embodiment if information on whether or not there is a short is sent, information on the input/output devices may be sent together. This means that a short, if any, often results in maintenance such as repair/replacement of the shorting input/output device. Thus, by having the slaves store and retain in advance information on the input/output devices connected to themselves, namely, information indicating ID of the devices (device name, manufacturer name, model, and manufacture number), and by outputting information indicating ID of a failed device together, a user can know in advance information on the failed device. Therefore, when visiting a site, he/she can carry with him/her parts for replacement of this device or a device to be replaced, and thus carry out maintenance quickly.

As described so far, according to examples of the fifth embodiment and its modification, as a host station can get a state of the power supply (I/O power supply) for the input/output devices connected to respective slaves, the host station can quickly determine a reason that a signal does not come from the slaves, namely, whether it is because power source is not supplied to the input device or because a signal is not really input nor input. Therefore, an effect of improving reliability of the system can be produced.

Also, although the fifth embodiment shows an example of the master unit as a host station that receives a notice of information on ON/OFF of the I/O power supply or voltage value, the present invention is not limited to this, and may also apply to other controllers. In addition, irrespective of the concept of a host station, it may be a configurator as in the fourth embodiment or a monitor 62. In addition, various nodes connected to a network, such as other slave, can be a destination of transmission.

This also holds in the first to fourth embodiments. In other words, information obtained at each slave can be sent to various nodes connected to the network.

Furthermore, in the above respective embodiments, the example was shown wherein the slaves transmit and receive I/O information to/from the master unit, and system is controlled through transmission to and reception from the controller (PLC) of such I/O information by way of the master unit, and the master-slave method between the master and the slave was explained whereby a desired slave sends back a response to a request from the master. However, a slave meant by the present invention is not limited to a slave that conducts master-slave communications. This means that although it is referred to as a slave, it can employ any communications scheme. In this respect, strictly speaking, it is the slave that includes a concept different from the generally defined slave. In other words, a slave meant by the present invention may employ any communications protocol in real transmission/reception, if the capability of sending and receiving I/O information necessary for control to/from the controller is available. In particular, a destination of transmission of non-I/O information, that is a transmission object in the present invention, is not limited to a master unit or controller, and can be various nodes such as a configurator or monitor or other slaves connected to a network. Thus, a communications scheme can be selected as appropriate, depending on a recipient. Of course, a trigger to send is not limited to those executed as per request from the external, and transmission may be carried out based on an internal trigger (event that is generated when certain conditions are met, etc.).

EFFECTS OF INVENTION

As described before, the present invention provides a measuring means, whereby physical volume of a control unit or slaves is measured, independent of control. Thus, without affecting the control system, non-control data (non-I/O data) such as service information is reserved at slaves, output to a circuit (network) with predetermined timing, and notified to a predetermined recipient.

What it claimed is:

1. A slave to which a control device is connected, said slave configured to communicate input or output information of said control device with a controller via a remote circuit, said slave comprising:

a measuring means for measuring a physical quantity related to said control device or said slave itself to provide measured values; and an output means for outputting information based on said measured values to said remote circuit if predetermined conditions are met, and wherein said physical quantity is operating time that is timed by using a change to data on input or output information to a control device connected to either the slave itself or another slave as a trigger.

2. The slave as in claim 1, wherein a distant party to whom said output means communicates information via said remote circuit is any of a controller or a monitor or a slave connected to the remote circuit.

3. The slave as in claim 1, further comprising:

a comparison means for storing and retaining setting information to identify a normal range of said operating time, and comparing said operating time determined by timing with said setting information.

4. A slave to which a control unit is connected, said slave configured to communicate input or output information of said control unit with a controller via a remote circuit, said slave comprising:

a measuring means for measuring a physical quantity related to said control unit or said slave itself to provide a measured value;

a determining means for comparing the measured value with a reference value to provide determination result information; and an output means for outputting the determination result information to said remote circuit, wherein said physical quantity related to said control unit is a supply voltage to be incorporated by a slave and supplied to said control unit by way of the slave, and wherein said physical quantity related to said slave itself is a voltage of a network power source supplied to the slave itself by way of said remote circuit.

5. The slave as in claim 4, wherein a distant party to whom said output means communicates information via said remote circuit is any of a controller or a monitor or slave connected to the circuit.

6. A slave to which a control unit is connected, said slave configured to communicate input or output information of said control unit with a controller via a remote circuit, said slave comprising:

a measuring means for measuring a physical quantity related to said control unit or said slave itself to provide a measured value;

a determining means for comparing the measured value with a reference value to provide determination result information; and an output means for outputting both the measured value and the determination result information to said remote circuit, wherein said physical quantity related to said control unit is a supply voltage to be incorporated by a slave and supplied to said control unit by way of the slave, and wherein said physical quantity related to said slave itself is a voltage of a network power source supplied to the slave itself by way of said remote circuit.

7. A node device configured to be connected to a network for factory automation (FA), comprising a means for obtaining from a first slave connected to the network, information on a start time when a control device attached to the first slave starts operating;

a means for obtaining from a second slave connected to the network, information on an elapsed time when said control device enters into a predetermined state, based on a detection signal generated when said control device enters the predetermined state and provided to said second slave connected to the network; and a computing unit that computes an operating time of said control device based on the said start time information and said elapsed time information.

8. A processing method of a slave that determines operating time of a control device which is connected to the slave, the slave configured to communicate input or output information of said control device with a controller via network for factory automation (PA), the method comprising:

(a) obtaining start time information of when said control device starts operating, based on an output signal to the control device;

(b) obtaining elapsed time information of when said control device enters into a predetermined state, based on a detection signal that detects said control device has entered into a predetermined state; and (c) computing operating time of said control device, based on said start time information and said elapsed time information, and wherein the steps (a) through (c) are executed independent of a communications process that communicates input or output information with said controller.

9. A processing method of a slave to which a control device is connected, the slave configured to communicate input or output information of said control device with a controller via a remote circuit, the method comprising:

(a) measuring, in the slave, a physical quantity related to said control device or said slave itself to provide a measured value;

(b) comparing, in the slave, the measured value with a reference value to provide comparison result information;

(c) outputting the comparison result information to said remote circuit, and wherein the steps (a) through (c) are executed independent of a communications process that communicates input or output information with said controller.

10. A processing unit that is incorporated in slaves or a monitor connected to a network for factory automation (FA) and that determines operating time of a predetermined apparatus, comprising:

a means for obtaining information on a start time when a signal state of an IN terminal of a first slave, to which is connected a first input device monitoring conditions of said predetermined apparatus, has changed;

a means for obtaining information on elapsed time when a signal state of an IN terminal of a second slave, to which is connected a second input device monitoring conditions of said predetermined apparatus, has changed; and a means for computing operating time of said predetermined apparatus based on said start time information and said elapsed time information.

11. A monitoring system of a power supply in a network system that connects a controller, a slave and a monitoring unit via a network, to supply a power source to said slave and a control unit connected to said slave, the system comprising:

in said slave, a communicating means for communicating input or output information of said control unit via said network, a power supply monitoring means for monitoring a state of said power supply, and an output means for outputting to the network information on a monitoring state provided by the power supply monitoring means, wherein said monitoring unit comprises a means of collecting state information monitored by said power supply monitoring means, by communicating with the output means of the slave via said network, and a means of managing collected power supply states in a unified way.

12. A method of monitoring a power supply in a network system that connects a controller, a slave and a monitoring unit via a network, to supply a power source to said slave and a control unit connected to said slave, the method comprising:

communicating, via said slave, input or output information of said control unit via said network;

monitoring, via said slave, a state of said power supply;

outputting, via said slave, information on a monitored state monitored by a power supply monitoring means to the network; and communicating, via said monitoring unit with an output means of the slave via said network, collecting state information monitored by said power supply monitoring means through the process of communicating, and managing collected power supply states.

13. A method of monitoring a network system that connects a controller, a slave to which a control device is connected, and a monitoring unit via a network, comprising:

measuring, via said slave, a physical quantity related to said control device or said slave itself;

comparing, via said slave, a measured value with a reference value to provide comparison result information;

outputting, via said slave, the comparison result information to the network, while said slave executes the process of communicating input or output information of said control device with a controller via the network;

receiving, via at least either one of said controller or monitoring unit, the comparison result information of the slave; and managing the received comparison result information.

14. A slave to which a control unit is connected, said slave configured to communicate input or output information of said control unit with a controller via a remote circuit, said slave comprising:

a measuring unit which measures physical quantity related to said control unit or said slave itself to provide a measured value;

a determining unit which compares the measured value with a reference value to provide determination result information; and an output which outputs the determination result information to said remote circuit, wherein said physical quantity related to said control unit is a supply voltage to be incorporated by a slave and supplied to said control unit by way of the slave, and wherein said physical quantity related to said slave itself is a voltage of a network power source supplied to the slave itself by way of said remote circuit.

15. A slave to which a control unit is connected, said slave configured to communicate input or output information of said control unit with a controller via a remote circuit, said slave comprising:

a measuring means for measuring a physical quantity related to said control unit or said slave itself to provide a measured value;

a determining means for comparing the measured value with a reference value to provide determination result information; and an output means for outputting the determination result information to said remote circuit, wherein said physical quantity related to said control unit is energized time of said control unit, and wherein said physical quantity related to said slave itself is energized time of said slave itself.

16. A slave to which a control unit is connected, said slave configured to communicate input or output information of said control unit with a controller via a remote circuit, said slave comprising:

a measuring means for measuring a physical quantity related to said control unit or said slave itself to provide a measured value;

a determining means for comparing the measured value with a reference value to provide determination result information; and an output means for outputting the determination result information to said remote circuit, wherein said physical quantity related to said control unit is the number of operations of said control unit, and wherein said physical quantity related to said slave itself is the number of communication errors or abnormal communications which occur in said slave itself.

* * * * *